US012663606B2

(12) United States Patent
Tsai et al.

(10) Patent No.: US 12,663,606 B2
(45) Date of Patent: *Jun. 23, 2026

(54) IMAGING LENS MODULE AND ELECTRONIC DEVICE

(71) Applicant: LARGAN DIGITAL CO., LTD., Taichung City (TW)

(72) Inventors: Chun-Hua Tsai, Taichung City (TW); Ming-Ta Chou, Taichung City (TW); Ming-Shun Chang, Taichung City (TW)

(73) Assignee: LARGAN DIGITAL CO., LTD., Taichung City (TW)

( * ) Notice: Subject to any disclaimer, the term of this patent is extended or adjusted under 35 U.S.C. 154(b) by 253 days.

This patent is subject to a terminal disclaimer.

(21) Appl. No.: 18/402,280

(22) Filed: Jan. 2, 2024

(65) Prior Publication Data

US 2024/0134149 A1 Apr. 25, 2024
US 2024/0231039 A9 Jul. 11, 2024

Related U.S. Application Data

(63) Continuation of application No. 17/970,304, filed on Oct. 20, 2022, now Pat. No. 11,899,273, which is a (Continued)

(30) Foreign Application Priority Data

Jun. 25, 2019 (TW) ................................. 108122184

(51) Int. Cl.
G02B 7/09 (2021.01)
G02B 7/04 (2021.01)
G02B 30/00 (2020.01)

(52) U.S. Cl.
CPC ................. *G02B 7/09* (2013.01); *G02B 7/04* (2013.01); *G02B 30/00* (2020.01)

(58) Field of Classification Search
CPC . G02B 7/09; G02B 7/02; G02B 7/021; G02B 7/022; G02B 7/026; G02B 7/04; (Continued)

(56) References Cited

U.S. PATENT DOCUMENTS 8,805,176 B1 8/2014 Chou et al.
9,678,336 B2 6/2017 Cho et al.
(Continued)

FOREIGN PATENT DOCUMENTS

CN 202057870 U 11/2011
CN 205210390 U 5/2016
(Continued)

OTHER PUBLICATIONS

IN Examination Report dated Jul. 6, 2021 as received in Application No. 202034010462.
(Continued)

*Primary Examiner* — Marin Pichler
(74) *Attorney, Agent, or Firm* — Maschoff Brennan

(57) ABSTRACT

An imaging lens module with auto focus function includes an imaging lens assembly, an electromagnetic driving component assembly and a lens carrier. The imaging lens assembly has an optical axis. The electromagnetic driving component assembly drives the imaging lens assembly to move in a direction parallel to the optical axis by a Lorentz force. The imaging lens assembly is mounted to the lens carrier such that the imaging lens assembly can be wholly driven by the Lorentz force. The lens carrier includes an object-side part, a mounting structure and a plurality of plate portions. The object-side part includes a tip-end minimal aperture configured for light to travel through; and a tapered surface
(Continued)

which surrounds an area tapered off from image side to object side. The mounting structure and the plate portions are configured for at least a part of the electromagnetic driving component assembly to be mounted thereto.

12 Claims, 24 Drawing Sheets

Related U.S. Application Data continuation of application No. 16/700,995, filed on Dec. 2, 2019, now Pat. No. 11,506,861.

(58) Field of Classification Search
CPC ...... G02B 30/00; G02B 27/0018; G02B 7/08; G03B 13/36
USPC ......................... 359/811, 819, 822–824, 704
See application file for complete search history.

(56) References Cited

U.S. PATENT DOCUMENTS

| | | | |
|---|---|---|---|
| 9,746,634 B2 | 8/2017 | Wei et al. | |
| 9,746,635 B2 | 8/2017 | Wei et al. | |
| 9,759,886 B2 | 9/2017 | Wei et al. | |
| 2007/0086769 A1* | 4/2007 | Watanabe | G02B 7/08 |
| | | | 396/133 |
| 2012/0140330 A1 | 6/2012 | Nakayama et al. | |
| 2015/0077840 A1 | 3/2015 | Kim et al. | |
| 2015/0234145 A1 | 8/2015 | Chang | |
| 2015/0253569 A1 | 9/2015 | Lin | |
| 2016/0370579 A1 | 12/2016 | Cho et al. | |
| 2017/0139172 A1 | 5/2017 | Wei et al. | |
| 2017/0139173 A1 | 5/2017 | Wei et al. | |
| 2017/0139174 A1 | 5/2017 | Wei et al. | |
| 2017/0139175 A1 | 5/2017 | Wei et al. | |
| 2017/0139176 A1 | 5/2017 | Wei et al. | |
| 2017/0139177 A1 | 5/2017 | Wei et al. | |
| 2018/0003916 A1 | 1/2018 | Lin et al. | |
| 2018/0299637 A1 | 10/2018 | Wan | |
| 2019/0129149 A1 | 5/2019 | Yao | |
| 2020/0218030 A1 | 7/2020 | Kishimoto et al. | |
| 2020/0409028 A1 | 12/2020 | Tsai et al. | |

FOREIGN PATENT DOCUMENTS

| | | |
|---|---|---|
| CN | 205210492 U | 5/2016 |
| CN | 205507179 U | 8/2016 |
| CN | 206331166 U | 7/2017 |
| CN | 206671650 U | 11/2017 |
| CN | 209979984 U | 1/2020 |
| WO | 2019/064946 A1 | 4/2019 |

OTHER PUBLICATIONS

CN Office Action dated Jul. 9, 2021 as received in Application No. 201910667397.2.

* cited by examiner

20a

22a

21a

20e

22e

21e

IMAGING LENS MODULE AND ELECTRONIC DEVICE

RELATED APPLICATIONS

This application is a continuation patent application of U.S. application Ser. No. 17/970,304 filed on Oct. 20, 2022, which is a continuation patent application of U.S. application Ser. No. 16/700,995 filed on Dec. 2, 2019, which claims priority to Taiwan Application 108122184, filed on Jun. 25, 2019, which is incorporated by reference herein in its entirety.

BACKGROUND

Technical Field

The present disclosure relates to an imaging lens module, more particularly to an imaging lens module applicable to an electronic device.

Description of Related Art

With the development of semiconductor manufacturing technology, the performance of image sensors has been improved, and the pixel size thereof has been scaled down. Therefore, featuring high image quality becomes one of the indispensable features of an optical system nowadays.

A conventional lens assembly usually includes a lens barrel and a lens carrier assembled together by their thread structures. The position of the lens barrel with respect to the lens carrier is adjustable by rotating the lens barrel so as to focus images onto the image surface of the image sensor. However, the design requirements of thread structures may inevitably increase the size of the lens assembly and the assembling complexity. Furthermore, many conventional lens assemblies on the market usually have a voice coil motor (VCM) as a camera driver module for auto focus, and this kind of camera driver module usually consists of several components. For the requirements of accuracy and smoothness of movement of the lens unit, multiple alignment and calibration steps are needed during the assembly process of the camera driver module and the lens unit itself in order to complete the assembly of those components accurately. As a result, the manufacturing efficiency and yield rate of the camera driver module are therefore influenced.

Accordingly, how to improve the camera driver module for achieving a compact lens assembly and simplifying the assembly process of the lens assembly so as to meet the requirement of high-end-specification electronic devices is an important topic in this field nowadays.

SUMMARY

According to one aspect of the present disclosure, an imaging lens module with auto focus function includes an imaging lens assembly, an electromagnetic driving component assembly and a lens carrier.

The imaging lens assembly has an optical axis and includes an optical shielding plate and an object-side lens element. The optical shielding plate has an object-side surface, an image-side surface and a bore surface. The bore surface is connected to the object-side surface and the image-side surface. The optical shielding plate is disposed on an object side of the object-side lens element. The image-side surface of the optical shielding plate is in physical contact with the object-side lens element. There is no additional optical lens element disposed on the object side of the object-side lens element.

The electromagnetic driving component assembly is configured to drive the imaging lens assembly to move in a direction parallel to the optical axis and includes a first driving component and a second driving component. The first driving component is electrically conductive and configured for an electric current to flow through. The second driving component provides a permanent magnetic field toward the first driving component. The electromagnetic driving component assembly drives the imaging lens assembly to move in the direction parallel to the optical axis by a Lorentz force generated by an electromagnetic interaction between the first driving component and the second driving component.

The lens carrier is for the imaging lens assembly to be mounted thereto such that the imaging lens assembly can be wholly driven to move in the direction parallel to the optical axis by the Lorentz force. The lens carrier includes an object-side part and a mounting structure.

The object-side part is located at an object-side end of the lens carrier and includes a tip-end minimal aperture and a first annular mounting surface. The tip-end minimal aperture is configured for light to travel through in the imaging lens assembly. The first annular mounting surface faces toward an image side, is configured for the optical shielding plate to be mounted thereon, and is in physical contact with the object-side surface of the optical shielding plate. The mounting structure is configured for one of the first driving component and the second driving component to be mounted thereto.

The lens carrier further includes a plurality of plate portions. The plate portions are located at the mounting structure and configured, together with the mounting structure, for the one of the first driving component and the second driving component to be mounted thereto.

The object-side part of the lens carrier further includes a tapered surface surrounding the tip-end minimal aperture. An area surrounded by the tapered surface tapers off from the image side to an object side. The tapered surface extends to the first annular mounting surface.

When an axial distance on the optical axis between the tip-end minimal aperture and the first annular mounting surface is h, and an angle between each of the plurality of plate portions and the first annular mounting surface is $\theta$, the following conditions are satisfied:

$$0.15 \text{ [mm]} \leq h \leq 1.3 \text{ [mm]; and}$$

$$80 \text{ [deg.]} < \theta < 100 \text{ [deg.]}.$$

According to another aspect of the present disclosure, an electronic device with photographing function includes a camera module and a cover glass. The camera module includes the aforementioned imaging lens module. The cover glass is disposed on an object side of the camera module, that is, the imaging lens module is mounted right under the cover glass of the electronic device. When an axial distance on the optical axis between the tip-end minimal aperture of the imaging lens module and the cover glass is g, the following condition is satisfied:

$$0.03 \text{ [mm]} < g < 0.3 \text{ [mm]}.$$

BRIEF DESCRIPTION OF THE DRAWINGS

The disclosure can be better understood by reading the following detailed description of the embodiments, with reference made to the accompanying drawings as follows.

DETAILED DESCRIPTION

Figure 1:
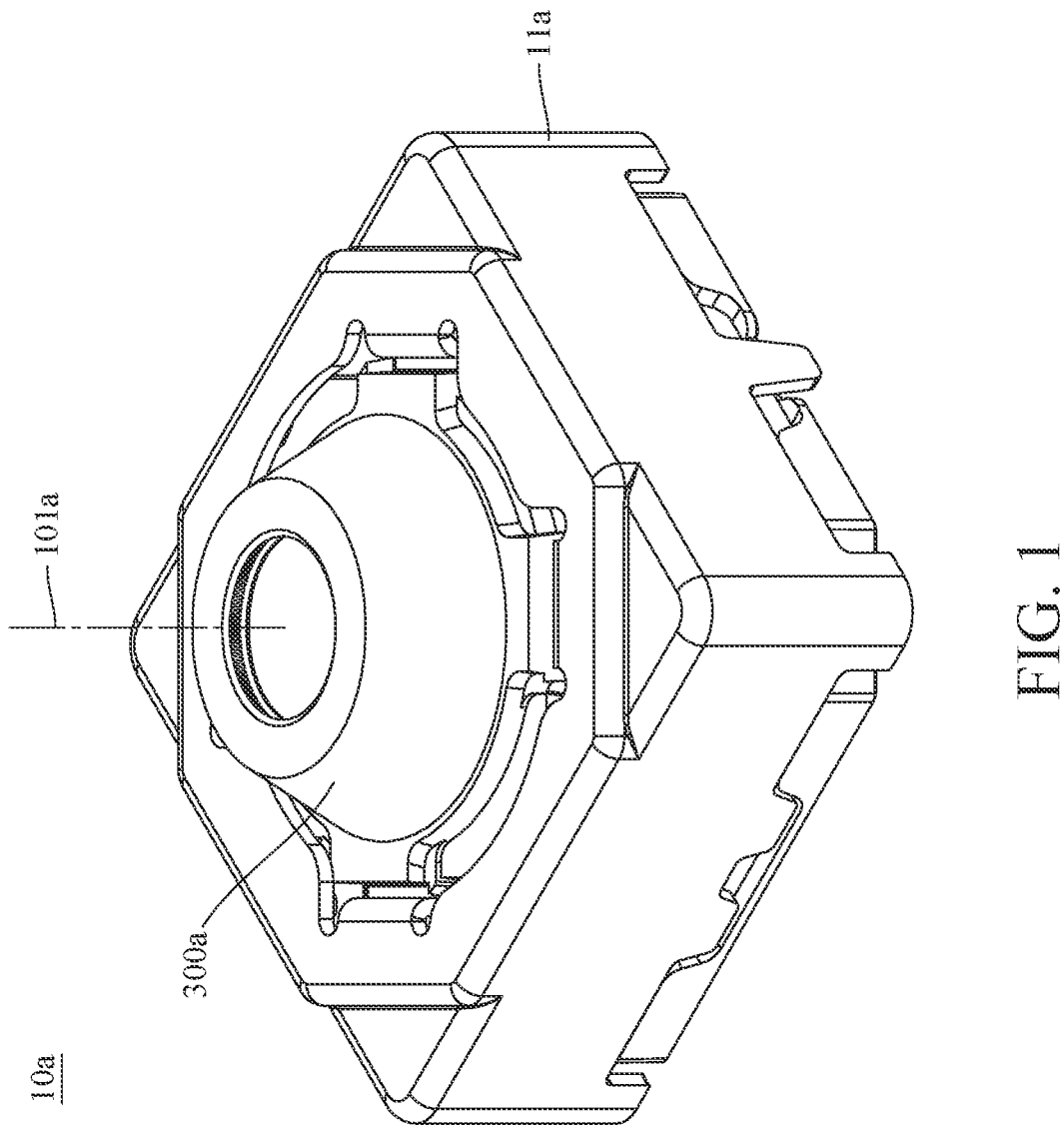
FIG. 1 is a perspective view of an imaging lens module according to the 1st embodiment of the present disclosure.

The present disclosure provides an imaging lens module with auto focus function which includes an imaging lens assembly, an electromagnetic driving component assembly and a les carrier.

The imaging lens assembly has an optical axis. The imaging lens assembly includes an optical shielding plate and an object-side lens element. The optical shielding plate has an object-side surface, an image-side surface and a bore surface. The bore surface is connected to the object-side surface and the image-side surface. The optical shielding plate is disposed on an object side of the object-side lens element. The image-side surface of the optical shielding plate is in physical contact with the object-side lens element.

There is no additional optical lens element disposed on the object side of the object-side lens element.

The electromagnetic driving component assembly is configured to drive the imaging lens assembly to move in a direction parallel to the optical axis. The electromagnetic driving component assembly includes a first driving component and a second driving component. The first driving component is electrically conductive and configured for an electric current to flow through. The second driving component provides a permanent magnetic field toward the first driving component. The electromagnetic driving component assembly drives the imaging lens assembly to move in the direction parallel to the optical axis by a Lorentz force generated by an electromagnetic interaction between the first driving component and the second driving component.

The lens carrier is for the imaging lens assembly to be mounted thereto such that the imaging lens assembly can be wholly driven to move in the direction parallel to the optical axis by the Lorentz force. The lens carrier includes an object-side part and a mounting structure. The object-side part is located at an object-side end of the lens carrier. The object-side part includes a tip-end minimal aperture and a first annular mounting surface. The tip-end minimal aperture is configured for light to travel through in the imaging lens assembly. The first annular mounting surface faces toward the image side. The first annular mounting surface is for the optical shielding plate to be mounted thereon and is in physical contact with the object-side surface of the optical shielding plate. The mounting structure is configured for one of the first driving component and the second driving component to be mounted thereto.

The lens carrier further includes a plurality of plate portions. The plate portions are located at the mounting structure and configured, together with the mounting structure, for the one of the first driving component and the second driving component to be mounted thereto. The object-side part of the lens carrier further includes a tapered surface. The tapered surface surrounds the tip-end minimal aperture. An area surrounded by the tapered surface tapers off from the image side to an object side, and the tapered surface extends to the first annular mounting surface.

When an axial distance on the optical axis between the tip-end minimal aperture and the first annular mounting surface is h, and an angle between each of the plate portions and the first annular mounting surface is θ, the following conditions are satisfied: 0.15 [mm]≤h≤1.3 [mm]; and 80 [deg.]<θ<100 [deg.]. Therefore, the process of manufacturing the tip-end minimal aperture and the plate portions by taking the first annular mounting surface as a reference plane is favorable for collimation of the displacement, in the direction parallel to the optical axis, of the imaging lens assembly driven by the electromagnetic driving component assembly so as to improve the efficiency of the auto focus function and is also favorable for simplifying the structure of the imaging lens module so as to reduce tolerance stack-up generated during assembling. Please refer to FIG. 6, which shows a schematic view of h and θ according to the 1st embodiment of the present disclosure.

The lens carrier can further include a tubular portion. The tubular portion can be connected to the object-side part. The tubular portion can include a plurality of second annular mounting surfaces. The second annular mounting surfaces can face and surround the optical axis. The second annular mounting surfaces are arranged coaxially from the object side to the image side, and the second annular mounting surfaces have diameters increasing from the object side to the image side. Therefore, it is favorable for preventing the roundness of the second annular mounting surfaces from being influenced by mounting two or more optical lens elements to the same second annular mounting surface so as to keep the coaxiality of each two adjacent optical lens elements.

The imaging lens assembly can further include at least one optical lens element. At least one of the second annular mounting surfaces can be in physical contact with the at least one optical lens element. Therefore, it is favorable for increasing the number of the optical lens elements in physical contact with the second annular mounting surfaces while keeping the design of roundness of the second annular mounting surfaces so as to improve the quality and reliability of the imaging lens module, and it is also favorable for increasing the structural strength of the lens carrier when the optical lens element and the electromagnetic driving component assembly are mounted to the lens carrier so as to prevent the imaging lens module from being structurally deformed.

The plate portions can have two opposite sides overlapping with the mounting structure in the direction parallel to the optical axis due to designing the injection mold of lens carrier such that the lens carrier have a slide configuration and thus the plate portions have two opposite sides overlapping with the mounting structure in the direction parallel to the optical axis after the plate portions being molded. Therefore, it is favorable for increasing the stability of mounting the electromagnetic driving component assembly to the lens carrier.

When a most-object-side outer diameter of the object-side part is φD, the following condition can be satisfied: 0.8 [mm]<φD≤3.4 [mm]. Therefore, a relatively small most-object-side outer diameter is favorable for the lens carrier, near the tip-end minimal aperture, to have a more uniform thickness and is also favorable for easily adjusting the injection-molded lens carrier to have an ideal surface property on the tip-end minimal aperture so as to improve the optical quality of the imaging lens module. Please refer to FIG. 6, which shows a schematic view of φD according to the 1st embodiment of the present disclosure.

The tip-end minimal aperture of the lens carrier defines an entrance pupil diameter of the imaging lens assembly. When the entrance pupil diameter of the imaging lens assembly is EPD, and the most-object-side outer diameter of the object-side part is φD, the following condition can be satisfied: 0.55<EPD/φD<1.0. Therefore, taking the mechanism dimension of the tip-end minimal aperture as the optical entrance pupil of the imaging lens module is favorable for increasing the optical specification reliability of the imaging lens module. Please refer to FIG. 6, which shows a schematic view of EPD and φD according to the 1st embodiment of the present disclosure.

The object-side part of the lens carrier can further include a plurality of straight structures. The straight structures can be disposed on the tapered surface and surround the tip-end minimal aperture, and the straight structures can extend away from the tip-end minimal aperture. Therefore, it is favorable for effectively suppressing and reducing high-intensity stray light in the environment, thereby eliminating the influence of stray light under a strong light source.

The straight structures each can have a cross-section being wedge-shaped. When a number of the straight structures is N, the following condition can be satisfied: 65<N<700. Therefore, it is favorable for preventing the efficiency of eliminating stray light from being reduced due to overly dense straight structures, and it is also favorable for preventing insufficiently eliminating stray light in local regions due to overly sparse straight structures.

The tapered surface can be a surface of a truncated cone. The tapered surface and the object-side surface of the optical shielding plate can be configured to form an annular groove structure, and an air interlayer between the tapered surface and the object-side surface of the optical shielding plate can taper off away from the tip-end minimal aperture. Therefore, it is favorable for effectively eliminating stray light incident on the imaging lens module in various angles so as to prevent overall optical image quality from being influence by stray light accumulating in a corner of the imaging lens module.

When the angle between each of the plurality of plate portions and the first annular mounting surface is θ, the following condition can be satisfied: 85 [deg.]<θ<95 [deg.]. Therefore, it is favorable for increasing the driving efficiency of the electromagnetic driving component assembly so as to prevent uneven displacement under the mechanism design of circular symmetry.

According to the present disclosure, the imaging lens module can further include a plurality of optical shielding components. The optical shielding components can be located on the image side of the optical shielding plate. When the entrance pupil diameter of the imaging lens assembly is EPD, and a minimum value among aperture diameters of the optical shielding components is φmin, the following condition can be satisfied: 0.90<EPD/φmin<1.4. Therefore, it is favorable for keeping the performance of the aperture stop and effectively controlling the reflection of stray light in the imaging lens module so as to prevent image quality from being negatively influenced by complex and multi-intensity light pollution factor in the environment. Moreover, the following condition can also be satisfied: 0.94<EPD/φmin<1.36. Therefore, the imaging lens module is favorable for having good imaging capability when directly pointing at an independent light source in nighttime. Moreover, the following condition can also be satisfied: 0.98<EPD/φmin<1.30. Therefore, the imaging lens module is favorable for maintain an ideal photographing quality when directly pointing at sunlight. Please refer to FIG. 5, which shows a schematic view of EPD and φmin according to the 1st embodiment of the present disclosure.

When the axial distance on the optical axis between the tip-end minimal aperture and the first annular mounting surface is h, the following condition can be satisfied: 0.15 [mm]≤h≤1.0 [mm]. Therefore, it is favorable for the imaging lens module to have a proper design of protruded aperture stop and is also favorable for greatly reducing the light cone area in front of the imaging lens module so as to effectively miniaturize the imaging lens module and increase design allowance based on the miniaturization of the imaging lens module.

The present disclosure provides an electronic device with photographing function which includes a camera module and a cover glass. The camera module includes the aforementioned imaging lens module. The cover glass is disposed on an object side of the camera module, that is, the imaging lens module is mounted right under the cover glass of the electronic device. When an axial distance on the optical axis between the tip-end minimal aperture of the imaging lens module and the cover glass is g, the following condition is satisfied: 0.03 [mm]<g<0.3 [mm]. Therefore, it is favorable for effectively reducing the reserved light cone area in front of the imaging lens module so as to greatly increase mechanism design allowance of camera module.

The cover glass can be a panel including a display module. Therefore, the cover glass is favorable for having ideal displaying quality even in the environment with short-distance and strong light pollution.

According to the present disclosure, the aforementioned features and conditions can be utilized in numerous combinations so as to achieve corresponding effects.

According to the above description of the present disclosure, the following specific embodiments are provided for further explanation.

1st Embodiment

Figure 2:
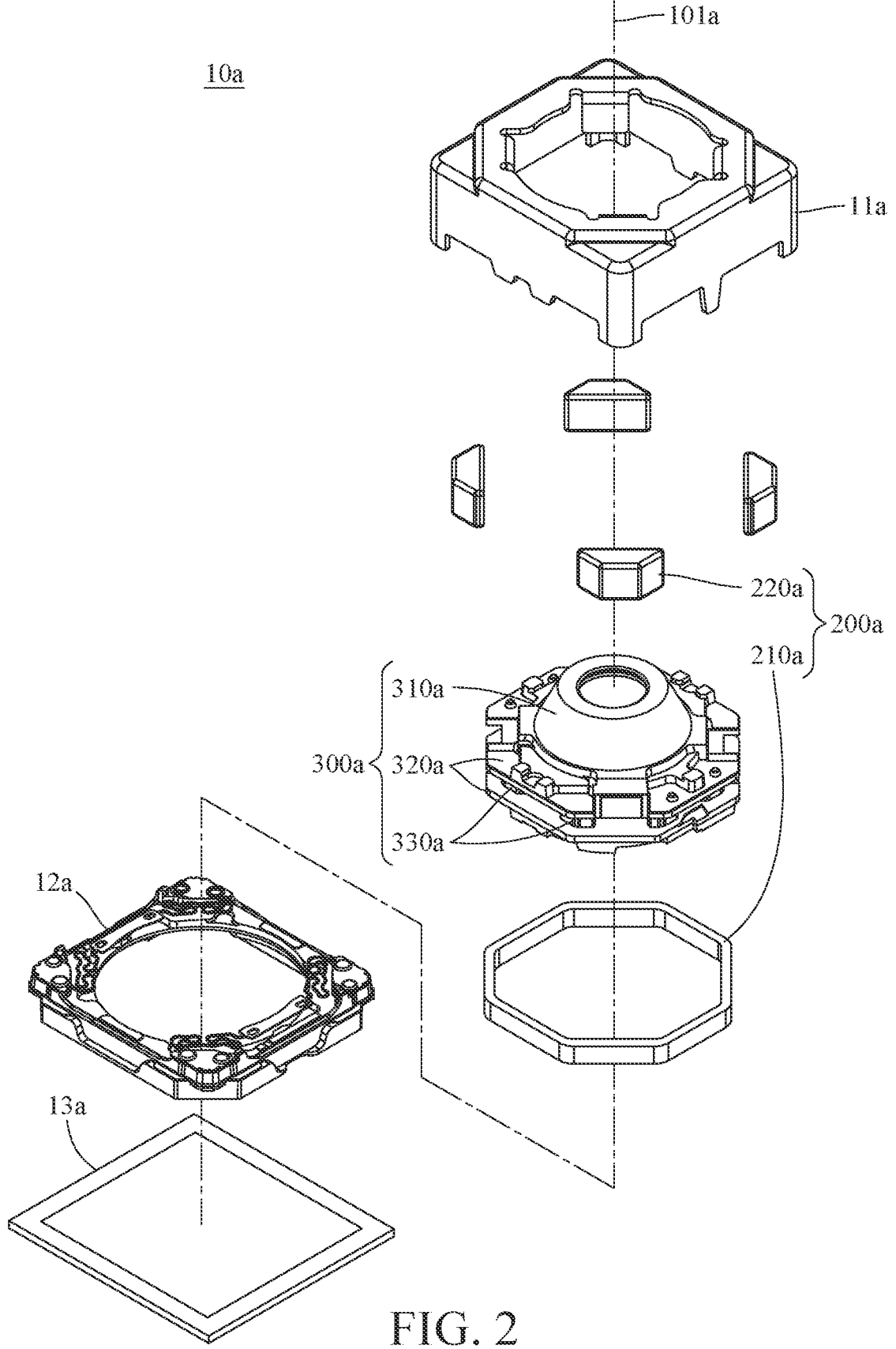
FIG. 2 is an exploded view of the imaging lens module in FIG. 1.
Figure 3:
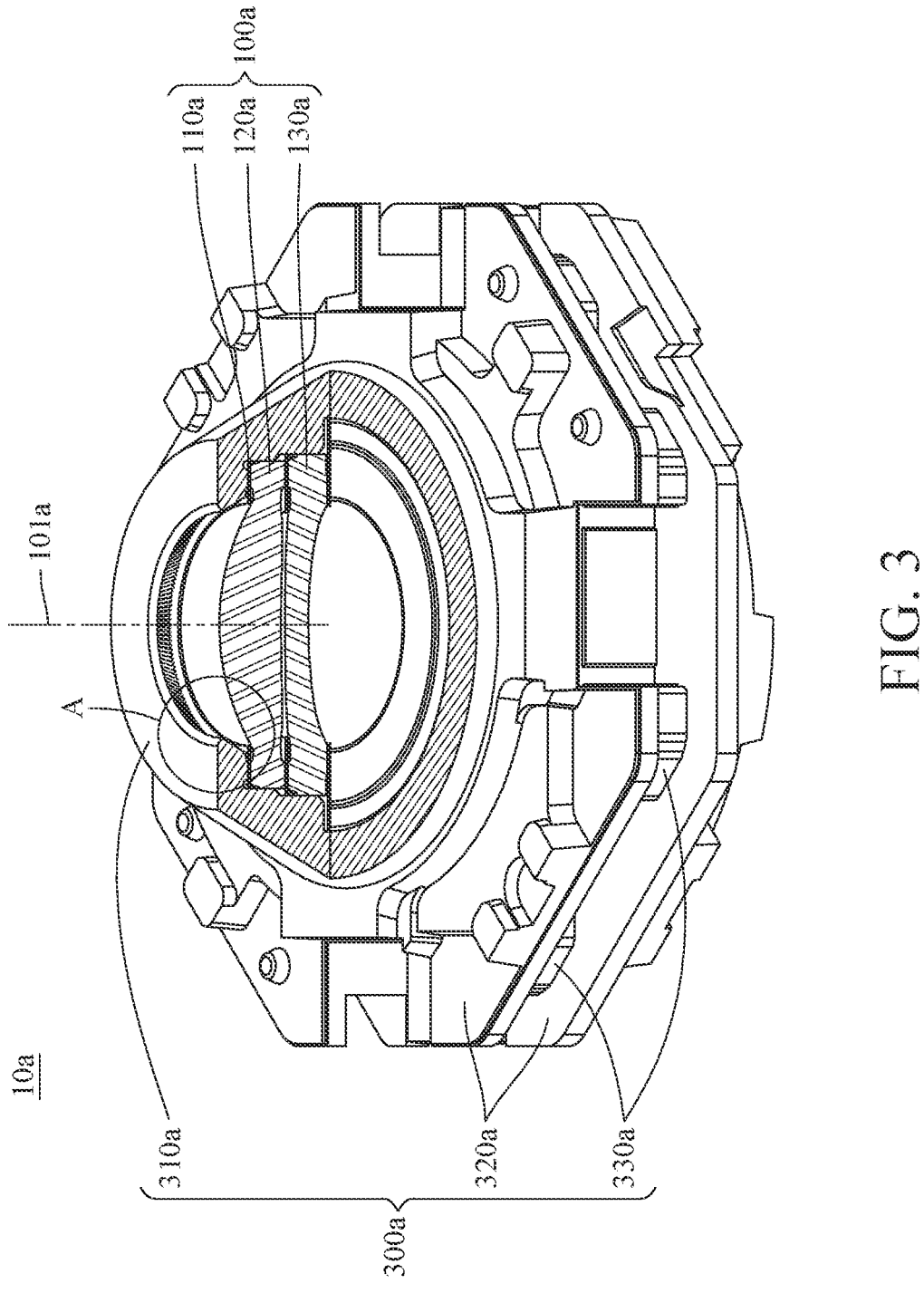
FIG. 3 is a partially sectioned view of the imaging lens assembly and lens carrier in FIG. 1.
Figure 4:
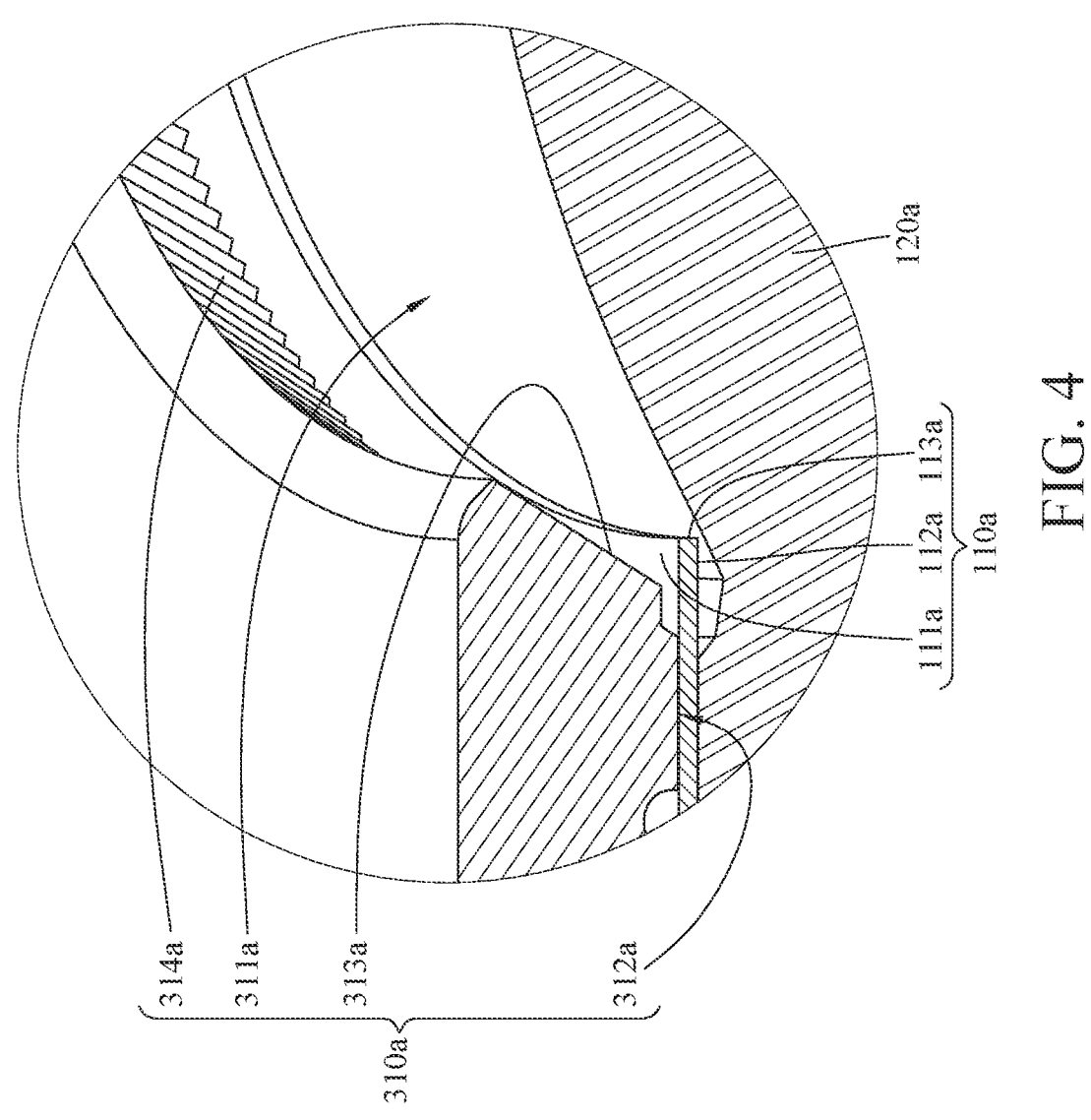
FIG. 4 is a partially enlarged view of the A region of the imaging lens assembly and lens carrier in FIG. 3.
Figure 5:
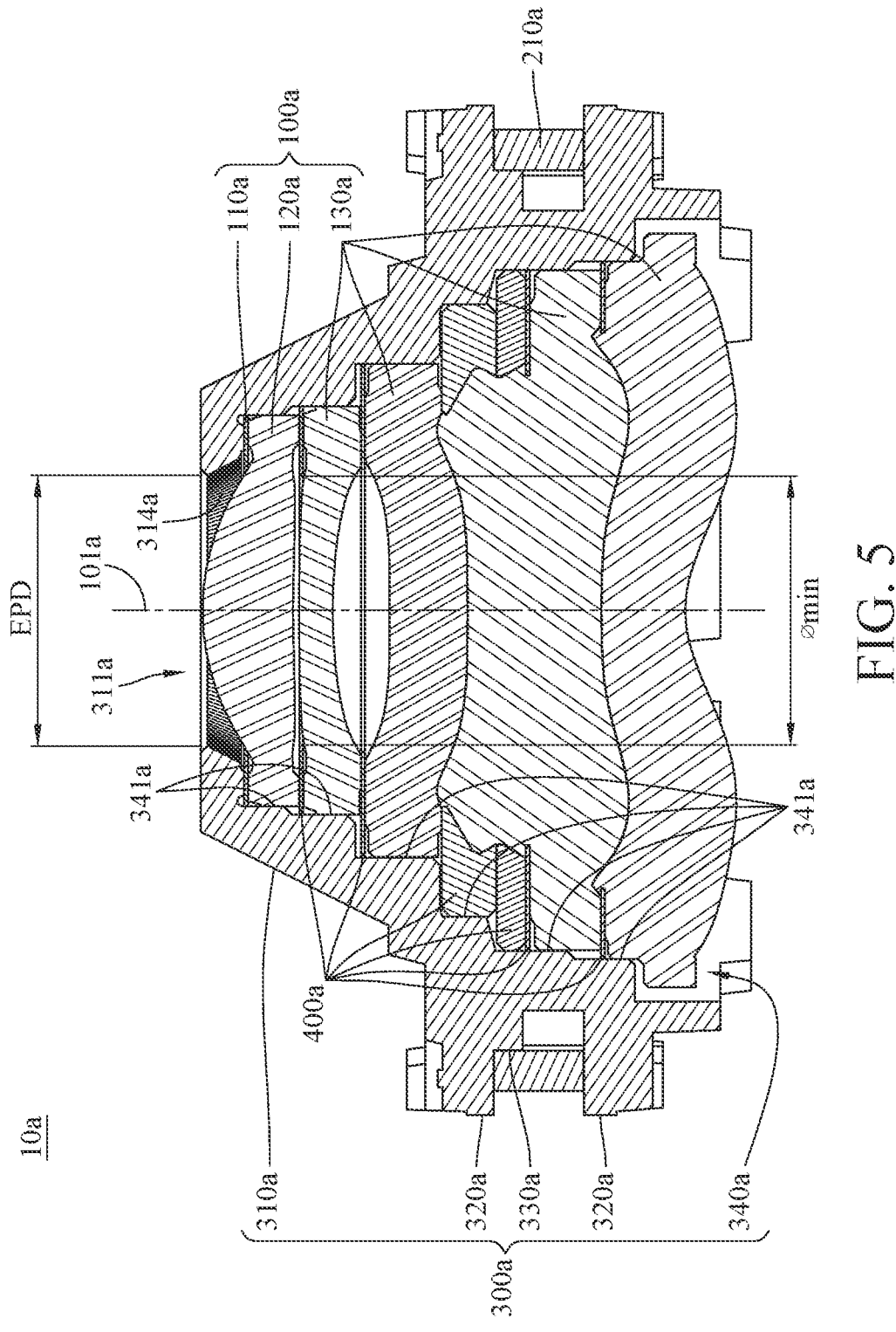
FIG. 5 is a cross-sectional view of the imaging lens assembly and lens carrier in FIG. 3.
Figure 6:
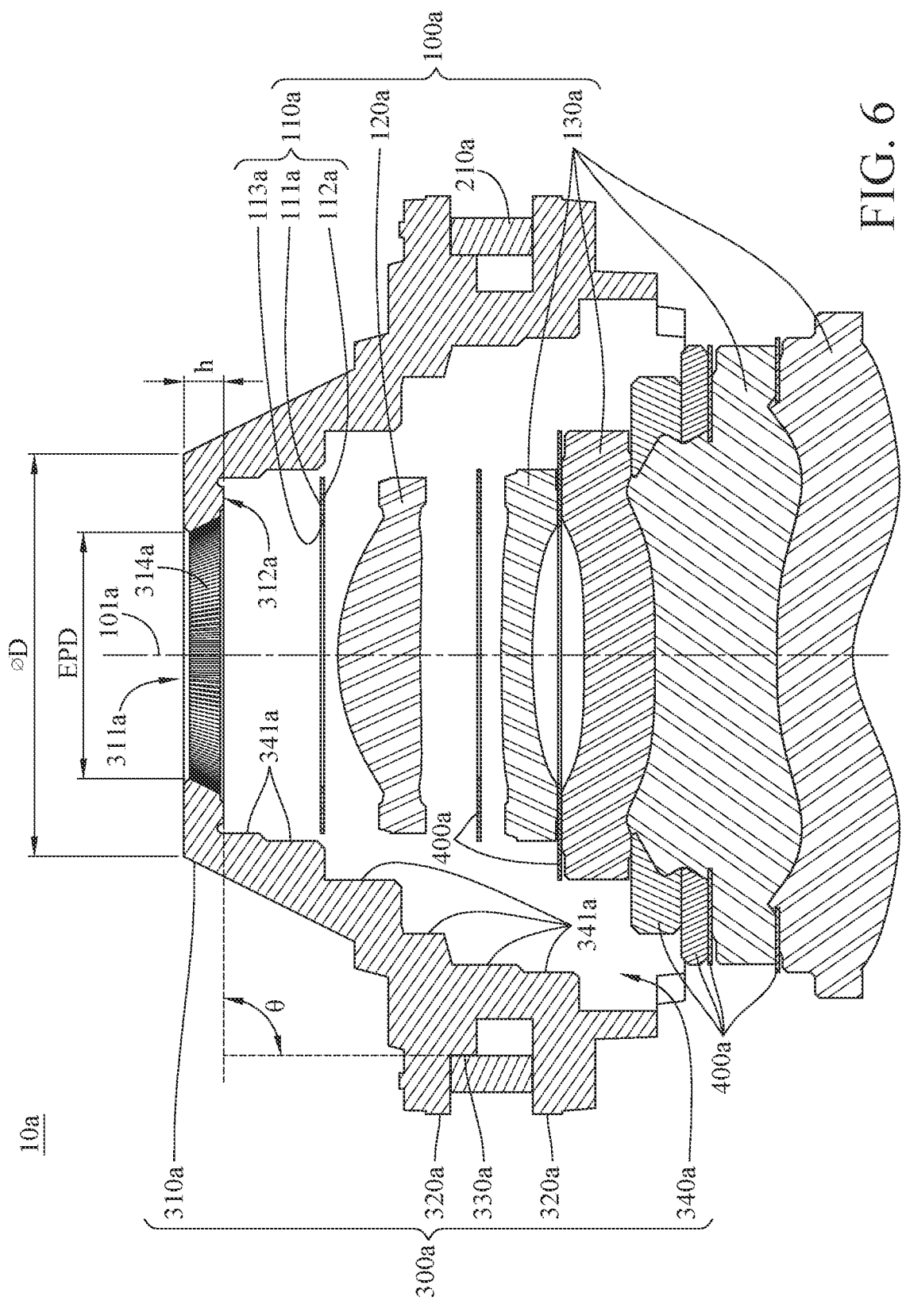
FIG. 6 is an exploded view of the imaging lens assembly and lens carrier in FIG. 5.

FIG. 1 is a perspective view of an imaging lens module according to the 1st embodiment of the present disclosure. FIG. 2 is an exploded view of the imaging lens module in FIG. 1. FIG. 3 is a partially sectioned view of the imaging lens assembly and lens carrier in FIG. 1. FIG. 4 is a partially enlarged view of the A region of the imaging lens assembly and lens carrier in FIG. 3. FIG. 5 is a cross-sectional view of the imaging lens assembly and lens carrier in FIG. 3. FIG. 6 is an exploded view of the imaging lens assembly and lens carrier in FIG. 5.

In this embodiment, an imaging lens module 10a with auto focus function includes a casing 11a, a support base 12a, an image sensor 13a, an imaging lens assembly 100a, an electromagnetic driving component assembly 200a, a lens carrier 300a and a plurality of optical shielding components 400a. The casing 11a and the image sensor 13a are respectively disposed on two opposite sides of the support base 12a, and the imaging lens assembly 100a, the electromagnetic driving component assembly 200a, the lens carrier 300a and the optical shielding components 400a are disposed between the casing 11a and the support base 12a.

The imaging lens assembly 100a has an optical axis 101a extending in a direction from an object side to an image side. The imaging lens assembly 100a includes, in order from the object side to the image side, an optical shielding plate 110a, an object-side lens element 120a and a plurality of optical lens elements 130a. The optical shielding plate 110a has an object-side surface 111a, an image-side surface 112a and a bore surface 113a, wherein the object-side surface 111a faces toward the object side, the image-side surface 112a faces toward the image side, and the bore surface 113a is connected to the object-side surface 111a and the image-side surface 112a. The optical shielding plate 110a is disposed on an object side of the object-side lens element 120a, and the image-side surface 112a of the optical shielding plate 110a is in physical contact with the object-side lens element 120a. There is no additional optical lens element disposed on the object side of the object-side lens element 120a. The object-side lens element 120a is made of plastic material.

The electromagnetic driving component assembly 200a can drive the imaging lens assembly 100a to move in a direction parallel to the optical axis 101a. Specifically, the electromagnetic driving component assembly 200a includes a first driving component 210a and a second driving component 220a. The first driving component 210a is electrically conductive for an electric current to flow through. The second driving component 220a is disposed on the casing 11a and provides a permanent magnetic field toward the first driving component 210a. The electromagnetic driving component assembly 200a can drive the imaging lens assembly 100a to move with respect to the second driving component 220a in the direction parallel to the optical axis 101a by a Lorentz force generated by an electromagnetic interaction between the first driving component 210a and the second driving component 220a so as to achieve the auto-focus function of the imaging lens module 10a.

The lens carrier 300a is disposed on the support base 12a, and the lens carrier 300a can be one-piece formed by injection molding. The lens carrier 300a, as a carrier of the imaging lens assembly 100a, is for the imaging lens assembly 100a to be mounted thereto such that the imaging lens assembly 100a can be wholly driven to move with respect to the second driving component 220a in the direction parallel to the optical axis 101a by the Lorentz force generated by the electromagnetic driving component assembly 200a. The lens carrier 300a includes an object-side part 310a, a mounting structure 320a, a plurality of plate portions 330a and a tubular portion 340a.

The object-side part 310a is located at an object-side end of the lens carrier 300a. When a most-object-side outer diameter of the object-side part 310a is φD, the following condition is satisfied: φD=2.6 [mm]. The object-side part 310a includes a tip-end minimal aperture 311a, a first annular mounting surface 312a, a tapered surface 313a and a plurality of straight structures 314a.

The tip-end minimal aperture 311a can control the amount of light travelling in the imaging lens assembly 100a so as to be an aperture stop of the imaging lens assembly 100a. When an entrance pupil diameter of the imaging lens assembly 100a defined by the tip-end minimal aperture 311a is EPD, and the most-object-side outer diameter of the object-side part 310a is φD, the following condition is satisfied: EPD/φD=0.61.

The first annular mounting surface 312a faces toward the image side. The first annular mounting surface 312a is for the optical shielding plate 110a to be mounted thereon and is in physical contact with the object-side surface 111a of the optical shielding plate 110a. When an axial distance on the optical axis 101a between the tip-end minimal aperture 311a and the first annular mounting surface 312a is h, the following condition is satisfied: h=0.216 [mm].

The tapered surface 313a surrounds the tip-end minimal aperture 311a. An area surrounded by the tapered surface 313a tapers off from the image side to the object side, and the tapered surface 313a extends to the first annular mounting surface 312a.

The straight structures 314a are disposed on the tapered surface 313a and surround the tip-end minimal aperture 311a, and the straight structures 314a extend away from the tip-end minimal aperture 311a. The straight structures 314a each have a cross-section being wedge-shaped. The straight structures 314a have smooth surfaces for eliminating light reflection. When a number of the straight structures is N, the following condition is satisfied: N=320.

The mounting structure 320a can be configured for the first driving component 210a to be mounted thereto. By the Lorentz force which is generated by the electromagnetic interaction between the first driving component 210a and the second driving component 220a, the lens carrier 300a, which is for the first driving component 210a to be mounted thereto, can be driven by the Lorentz force, and the imaging lens assembly 100a, which is for the lens carrier 300a to be mounted thereto, can also be wholly driven by the Lorentz force. Therefore, the imaging lens assembly 100a and the lens carrier 300a can be driven to move with respect to the second driving component 220a in the direction parallel to the optical axis 101a.

The plate portions 330a are located at the mounting structure 320a and have two opposite sides overlapping with the mounting structure 320a in the direction parallel to the optical axis 101a. That is, the plate portions 330a is clamped by the mounting structure 320a. The plate portions 330a, together with the mounting structure 320a, can be configured for the first driving component 210a to be mounted thereto, but the present disclosure is not limited thereto. In some embodiments, the plate portions, together with the mounting structure, can be configured for the second driving component to be mounted thereto, and the first driving component is disposed on the casing. The imaging lens assembly and the lens carrier can be wholly driven to move with respect to the first driving component in the direction parallel to the optical axis by the Lorentz force generated by the electromagnetic interaction between the first driving component and the second driving component. In this embodiment, when an angle between each of the plate portions 330a and the first annular mounting surface 312a is θ, the following condition is satisfied: θ=90.0 [deg.]. In addition, in some other embodiments, the plate portions can also be provided with a magnet such that the imaging lens assembly can be moved by using a spherical bearing in the imaging lens module.

The tubular portion 340a is connected to the object-side part 310a. The tubular portion 340a includes a plurality of second annular mounting surfaces 341a. The second annular mounting surfaces 341a face toward and surround the optical axis 101a. The second annular mounting surfaces 341a are arranged coaxially from the object side to the image side, and the second annular mounting surfaces 341a have diameters increasing from the object side to the image side. Some of the second annular mounting surfaces 341a are in physical contact with the optical lens elements 130a, and another some of the second annular mounting surfaces 341a are in physical contact with the optical shielding components 400a.

The optical shielding components 400a are located on an image side of the optical shielding plate 110a and the most-object side lens element 120a. When the entrance pupil diameter of the imaging lens assembly 100a is EPD, and a minimum value among aperture diameters of the optical shielding components 400a is φmin, the following condition is satisfied: EPD/φmin=1.0063.

2nd Embodiment

Figure 7:
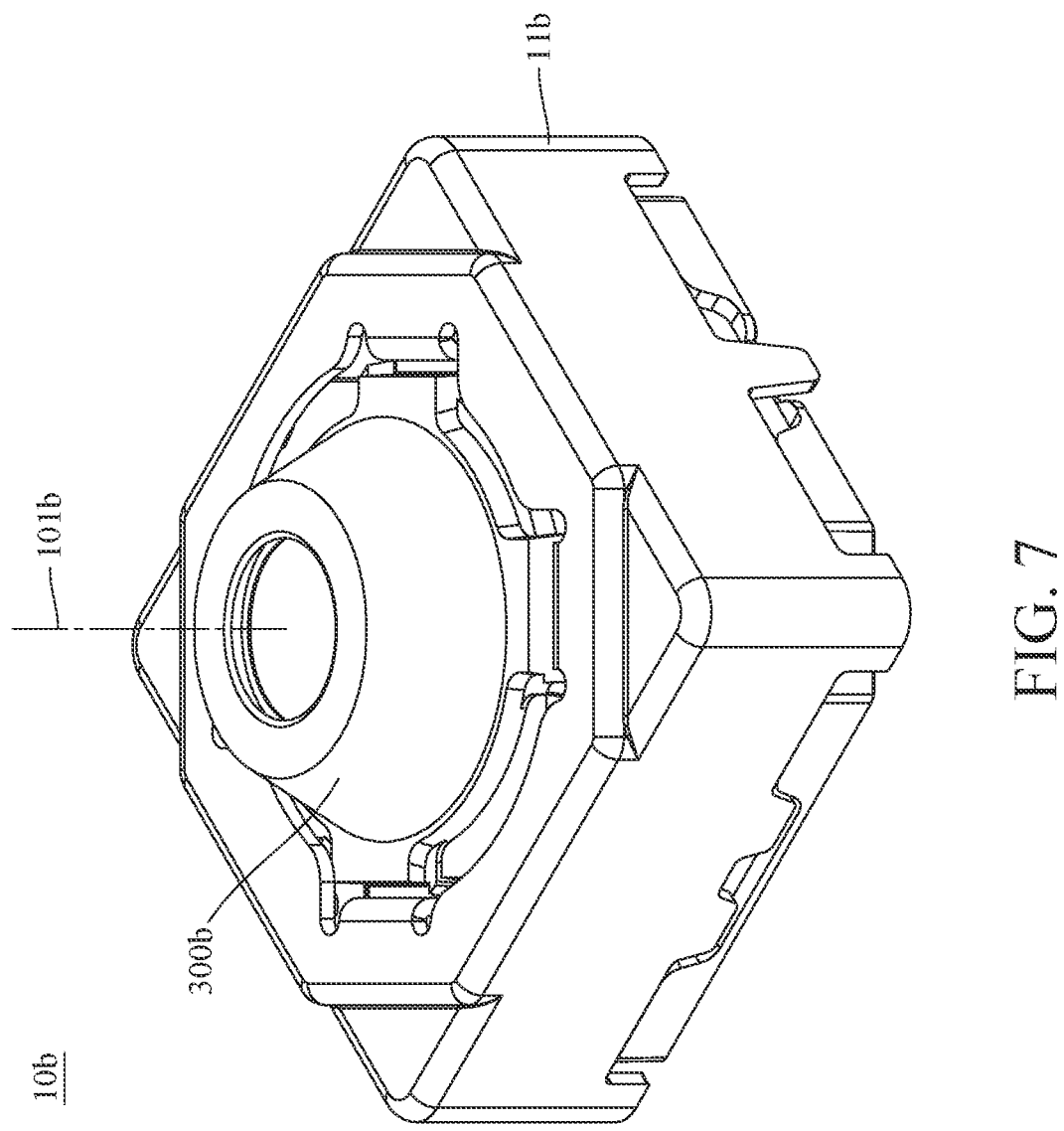
FIG. 7 is a perspective view of an imaging lens module according to the 2nd embodiment of the present disclosure.
Figure 8:
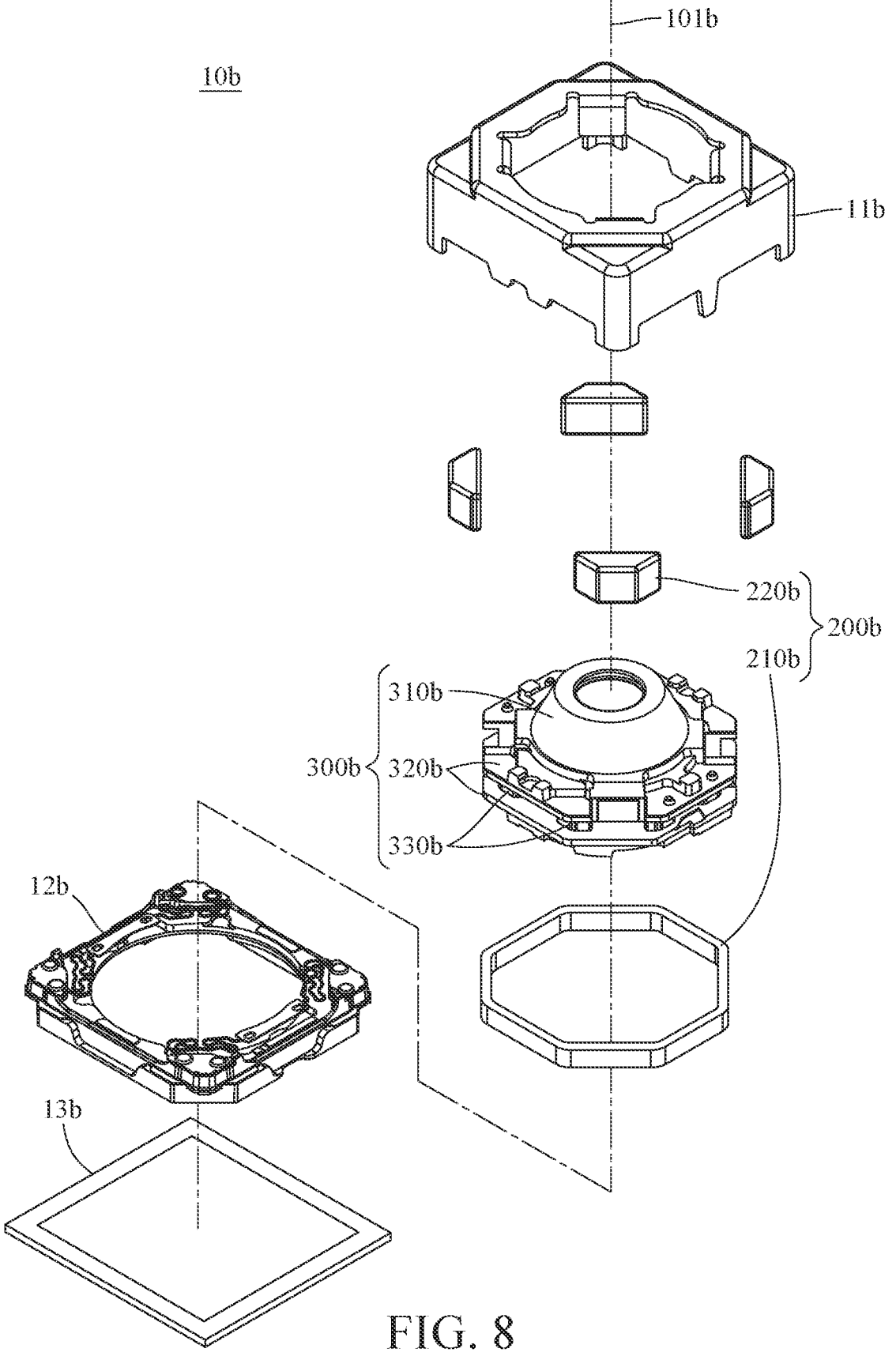
FIG. 8 is an exploded view of the imaging lens module in FIG. 7.
Figure 9:
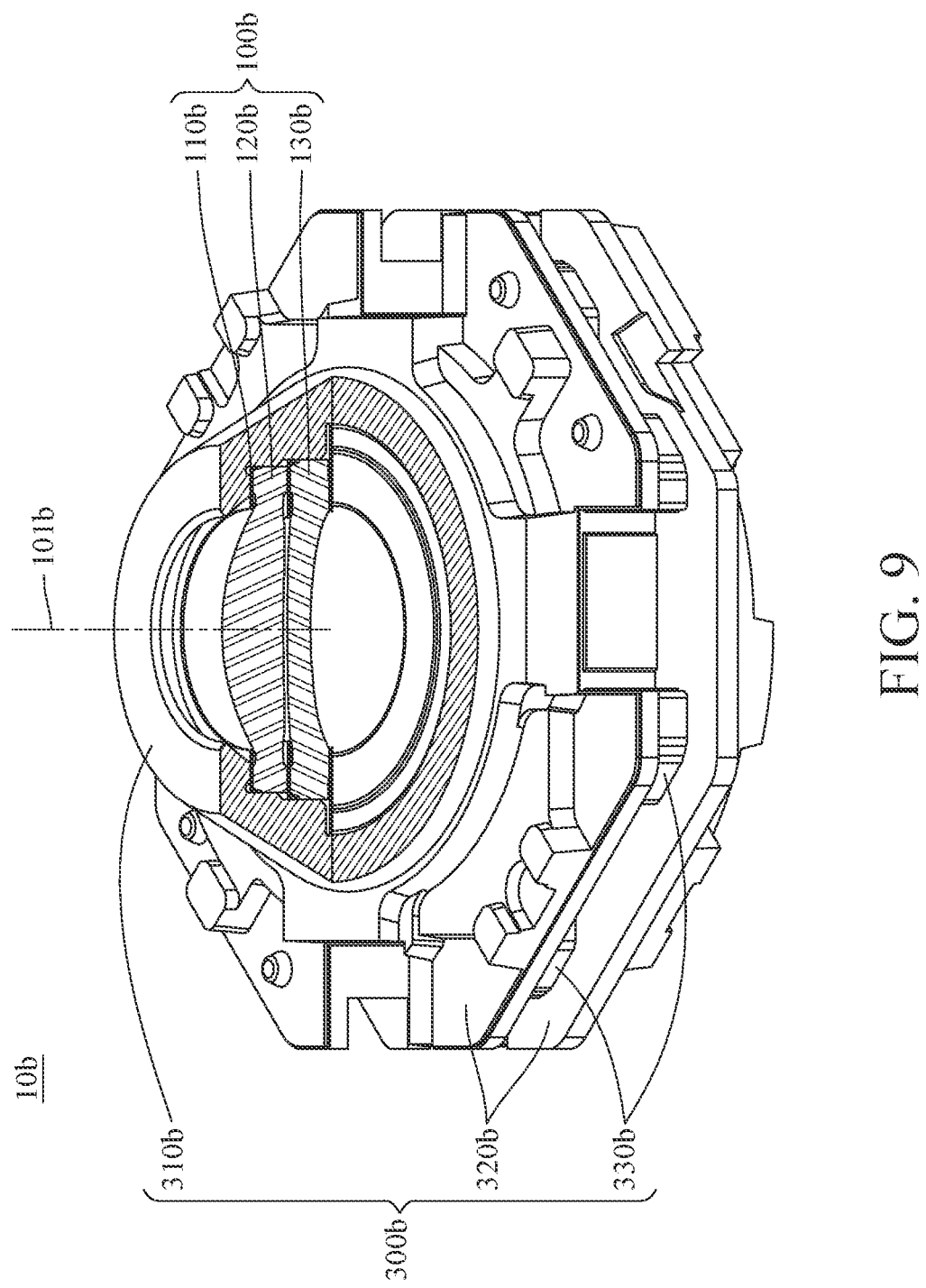
FIG. 9 is a partially sectioned view of the imaging lens assembly and lens carrier in FIG. 7.
Figure 10:
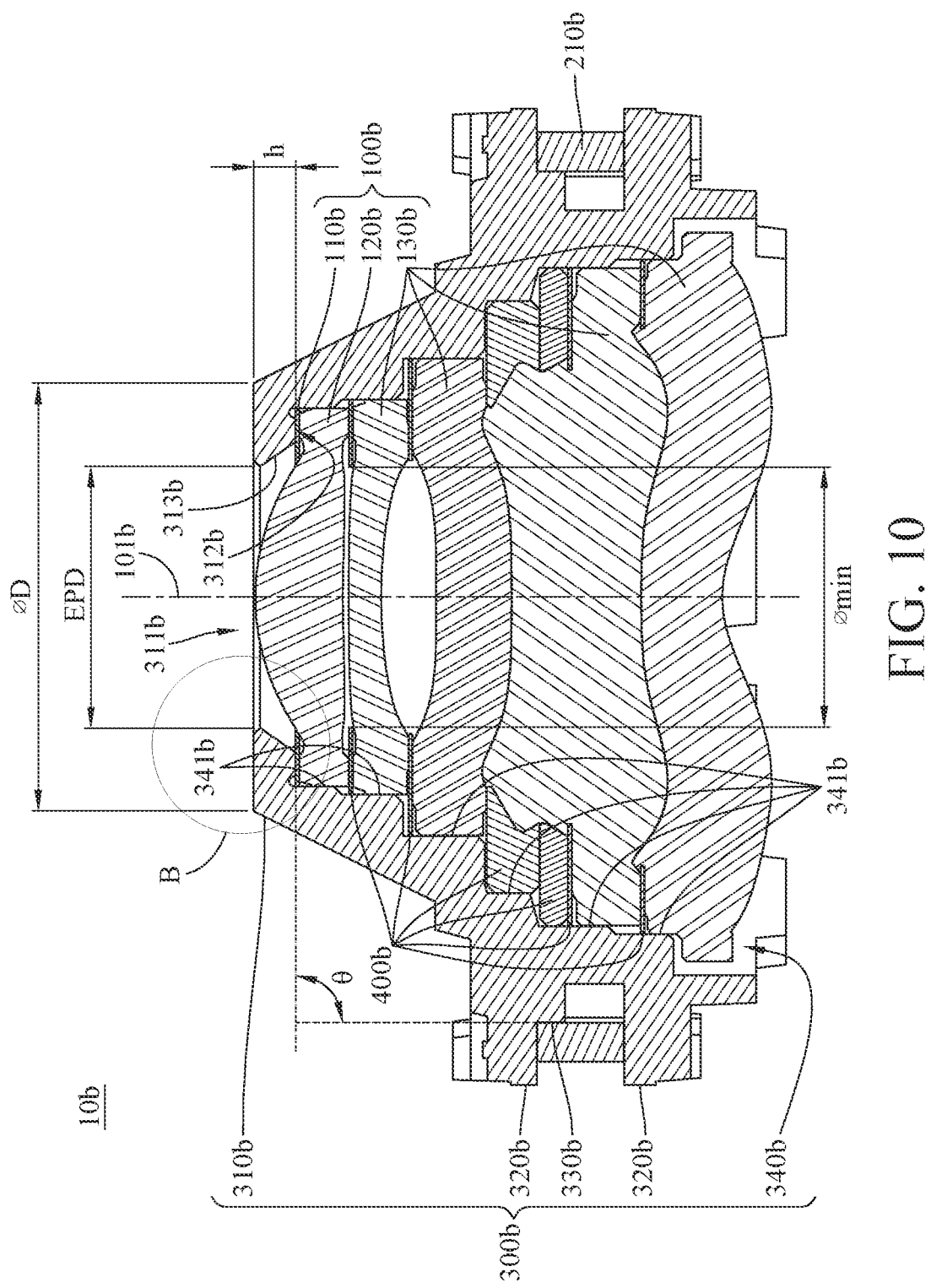
FIG. 10 is a cross-sectional view of the imaging lens assembly and lens carrier in FIG. 9.
Figure 11:
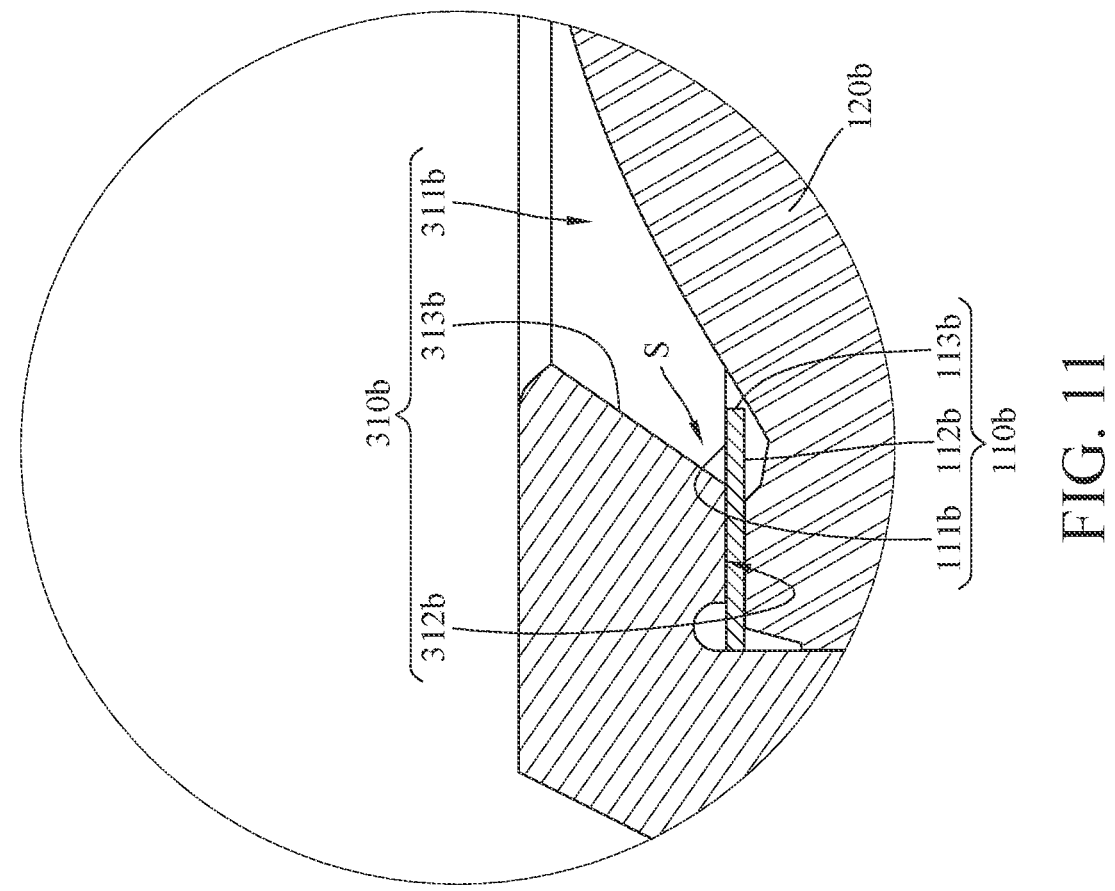
FIG. 11 is a partially enlarged view of the B region of the imaging lens assembly and lens carrier in FIG. 10.

FIG. 7 is a perspective view of an imaging lens module according to the 2nd embodiment of the present disclosure. FIG. 8 is an exploded view of the imaging lens module in FIG. 7. FIG. 9 is a partially sectioned view of the imaging lens assembly and lens carrier in FIG. 7. FIG. 10 is a cross-sectional view of the imaging lens assembly and lens carrier in FIG. 9. FIG. 11 is a partially enlarged view of the B region of the imaging lens assembly and lens carrier in FIG. 10.

In this embodiment, an imaging lens module 10b with auto focus function includes a casing 11b, a support base 12b, an image sensor 13b, an imaging lens assembly 100b, an electromagnetic driving component assembly 200b, a lens carrier 300b and a plurality of optical shielding components 400b. The casing 11b and the image sensor 13b are respectively disposed on two opposite sides of the support base 12b, and the imaging lens assembly 100b, the electromagnetic driving component assembly 200b, the lens carrier 300b and the optical shielding components 400b are disposed between the casing 11b and the support base 12b.

The imaging lens assembly 100b has an optical axis 101b extending in a direction from an object side to an image side. The imaging lens assembly 100b includes, in order from the object side to the image side, an optical shielding plate 110b, an object-side lens element 120b and a plurality of optical lens elements 130b. The optical shielding plate 110b has an object-side surface 111b, an image-side surface 112b and a bore surface 113b, wherein the object-side surface 111b faces toward the object side, the image-side surface 112b faces toward the image side, and the bore surface 113b is connected to the object-side surface 111b and the image-side surface 112b. The optical shielding plate 110b is disposed on an object side of the object-side lens element 120b, and the image-side surface 112b of the optical shielding plate 110b is in physical contact with the object-side lens element 120b. There is no additional optical lens element disposed on the object side of the object-side lens element 120b. The object-side lens element 120b is made of plastic material.

The electromagnetic driving component assembly 200b can drive the imaging lens assembly 100b to move in a direction parallel to the optical axis 101b. Specifically, the electromagnetic driving component assembly 200b includes a first driving component 210b and a second driving component 220b. The first driving component 210b is electrically conductive for an electric current to flow through. The second driving component 220b is disposed on the casing 11b and provides a permanent magnetic field toward the first driving component 210b. The electromagnetic driving component assembly 200b can drive the imaging lens assembly 100b to move with respect to the second driving component 220b in the direction parallel to the optical axis 101b by a Lorentz force generated by an electromagnetic interaction between the first driving component 210b and the second driving component 220b so as to achieve the auto-focus function of the imaging lens module 10b.

The lens carrier 300b is disposed on the support base 12b and the lens carrier 300b can be one-piece formed by injection molding. The lens carrier 300b, as a carrier of the imaging lens assembly 100b, is for the imaging lens assembly 100b to be mounted thereto such that the imaging lens assembly 100b can be wholly driven to move with respect to the second driving component 220b in the direction parallel to the optical axis 101a by the Lorentz force generated by the electromagnetic driving component assembly 200b. The lens carrier 300b includes an object-side part 310b, a mounting structure 320b, a plurality of plate portions 330b and a tubular portion 340b.

The object-side part 310b is located at an object-side end of the lens carrier 300b. When a most-object-side outer diameter of the object-side part 310b is φD, the following condition is satisfied: φD=2.6 [mm]. The object-side part 310b includes a tip-end minimal aperture 311b, a first annular mounting surface 312b and a tapered surface 313b.

The tip-end minimal aperture 311b can control the amount of light travelling in the imaging lens assembly 100b so as to be an aperture stop of the imaging lens assembly 100b. When an entrance pupil diameter of the imaging lens assembly 100b defined by the tip-end minimal aperture 311b is EPD, and the most-object-side outer diameter of the object-side part 310b is φD, the following condition is satisfied: EPD/φD=0.65.

The first annular mounting surface 312b faces toward the image side. The first annular mounting surface 312b is for the optical shielding plate 110b to be mounted thereon and in physical contact with the object-side surface 111b of the optical shielding plate 110b. When an axial distance on the optical axis 101b between the tip-end minimal aperture 311b and the first annular mounting surface 312b is h, the following condition is satisfied: h=0.216 [mm].

The tapered surface 313b surrounds the tip-end minimal aperture 311b. An area surrounded by the tapered surface 313$b$ tapers off from the image side to the object side, and the tapered surface 313$b$ extends to the first annular mounting surface 312$b$. The tapered surface 313$b$ is a surface of a truncated cone. The tapered surface 313$b$ and the object-side surface 111$b$ of the optical shielding plate 110$b$ are configured to form an annular groove structure. An air interlayer S between the tapered surface 313$b$ and the object-side surface 111$b$ of the optical shielding plate 110$b$ tapers off away from the tip-end minimal aperture 311$b$.

The mounting structure 320$b$ can be configured for the first driving component 210$b$ to be mounted thereto. By the Lorentz force which is generated by the electromagnetic interaction between the first driving component 210$b$ and the second driving component 220$b$, the lens carrier 300$b$, which is for the first driving component 210$b$ to be mounted thereto, can be driven by the Lorentz force, and the imaging lens assembly 100$b$, which is for the lens carrier 300$b$ to be mounted thereto, can also be wholly driven by the Lorentz force. Therefore, the imaging lens assembly 100$b$ and the lens carrier 300$b$ can be driven to move with respect to the second driving component 220$b$ in the direction parallel to the optical axis 101$b$.

The plate portions 330$b$ are located at the mounting structure 320$b$ and have two opposite sides overlapping with the mounting structure 320$b$ in the direction parallel to the optical axis 101$b$. That is, the plate portions 330$b$ is clamped by the mounting structure 320$b$. The plate portions 330$b$, together with the mounting structure 320$b$, can be configured for the first driving component 210$b$ to be mounted thereto, but the present disclosure is not limited thereto. In some embodiments, the plate portions, together with the mounting structure, can be configured for the second driving component to be mounted thereto, and the first driving component is disposed on the casing. The imaging lens assembly and the lens carrier can be wholly driven to move with respect to the first driving component in the direction parallel to the optical axis by the Lorentz force generated by the electromagnetic interaction between the first driving component and the second driving component. In this embodiment, when an angle between each of the plate portions 330$b$ and the first annular mounting surface 312$b$ is θ, the following condition is satisfied: θ=90.0 [deg.]. In addition, in some other embodiments, the plate portions can also be provided with a magnet such that the imaging lens assembly can be moved by using a spherical bearing in the imaging lens module.

The tubular portion 340$b$ is connected to the object-side part 310$b$. The tubular portion 340$b$ includes a plurality of second annular mounting surfaces 341$b$. The second annular mounting surfaces 341$b$ face toward and surround the optical axis 101$b$. The second annular mounting surfaces 341$b$ are arranged coaxially from the object side to the image side, and the second annular mounting surfaces 341$b$ have diameters increasing from the object side to the image side. Some of the second annular mounting surfaces 341$b$ are in physical contact with the optical lens elements 130$b$, and another some of the second annular mounting surfaces 341$b$ are in physical contact with the optical shielding components 400$b$.

The optical shielding components 400$b$ are located on an image side of the optical shielding plate 110$b$ and the most-object side lens element 120$b$. When the entrance pupil diameter of the imaging lens assembly 100$b$ is EPD, and a minimum value among aperture diameters of the optical shielding components 400$b$ is ϕmin, the following condition is satisfied: EPD/ϕmin=1.29.

3rd Embodiment

Figure 12:
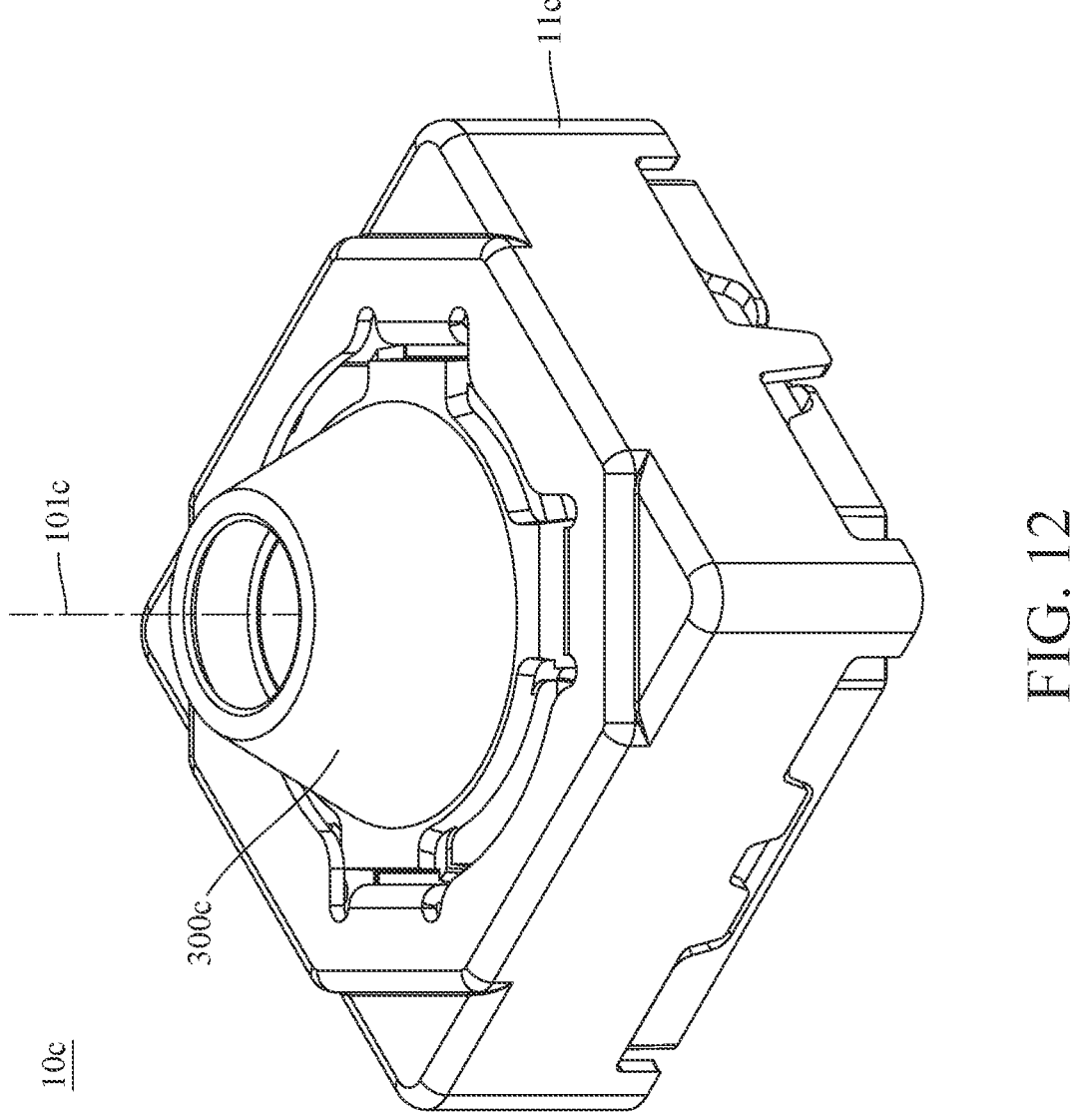
FIG. 12 is a perspective view of an imaging lens module according to the 3rd embodiment of the present disclosure.
Figure 13:
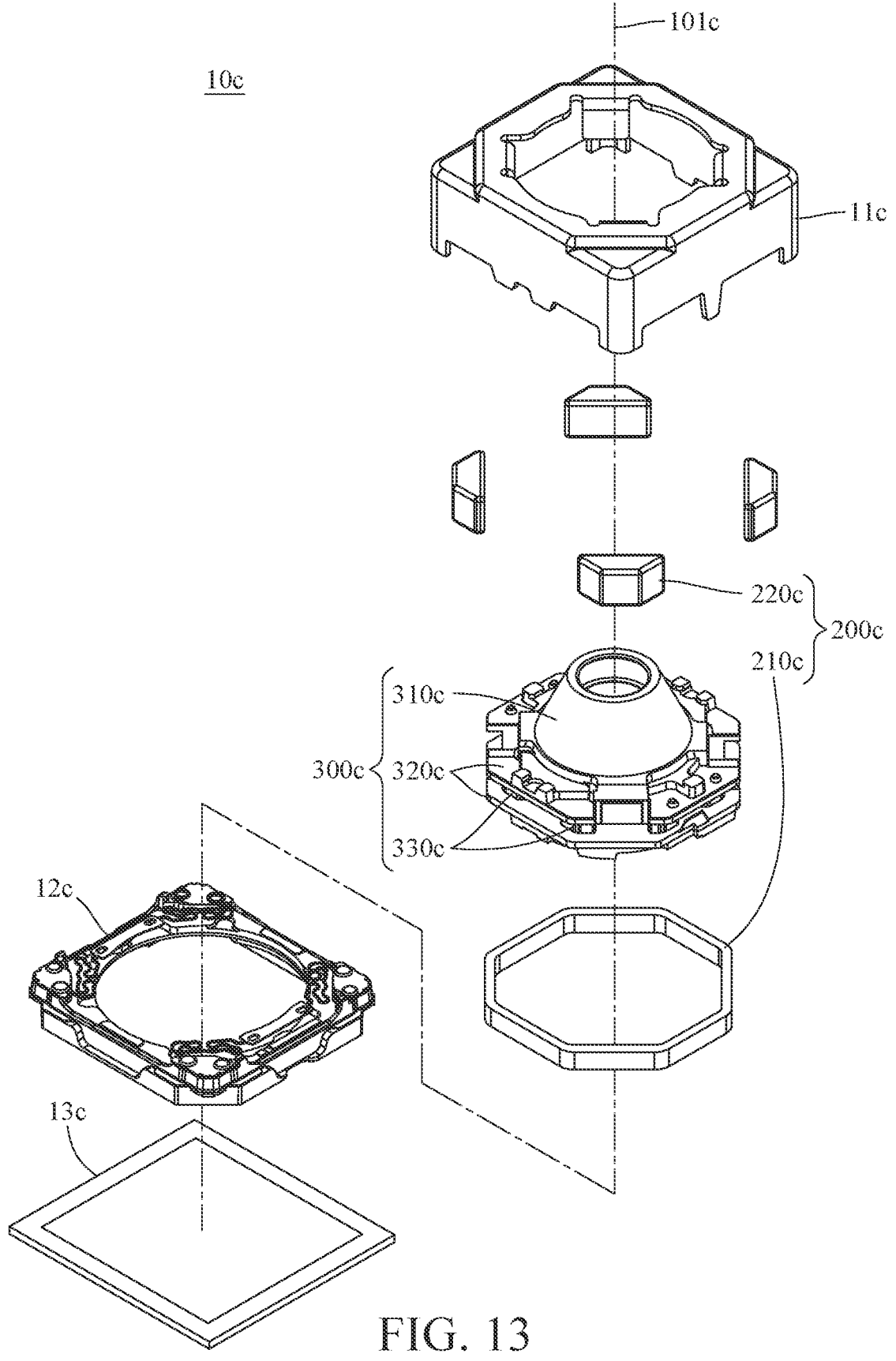
FIG. 13 is an exploded view of the imaging lens module in FIG. 12.
Figure 14:
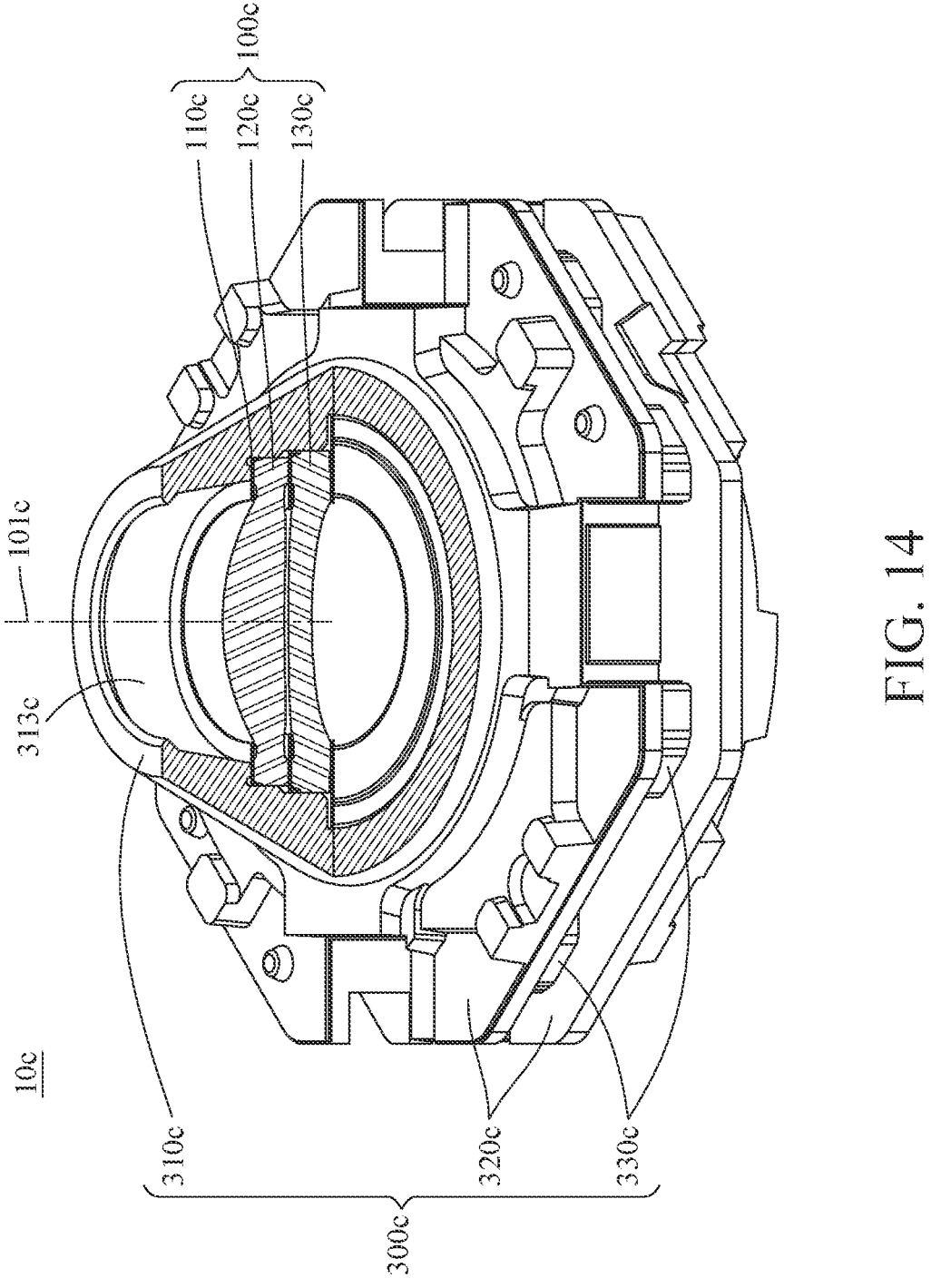
FIG. 14 is a partially sectioned view of the imaging lens assembly and lens carrier in FIG. 12.
Figure 15:
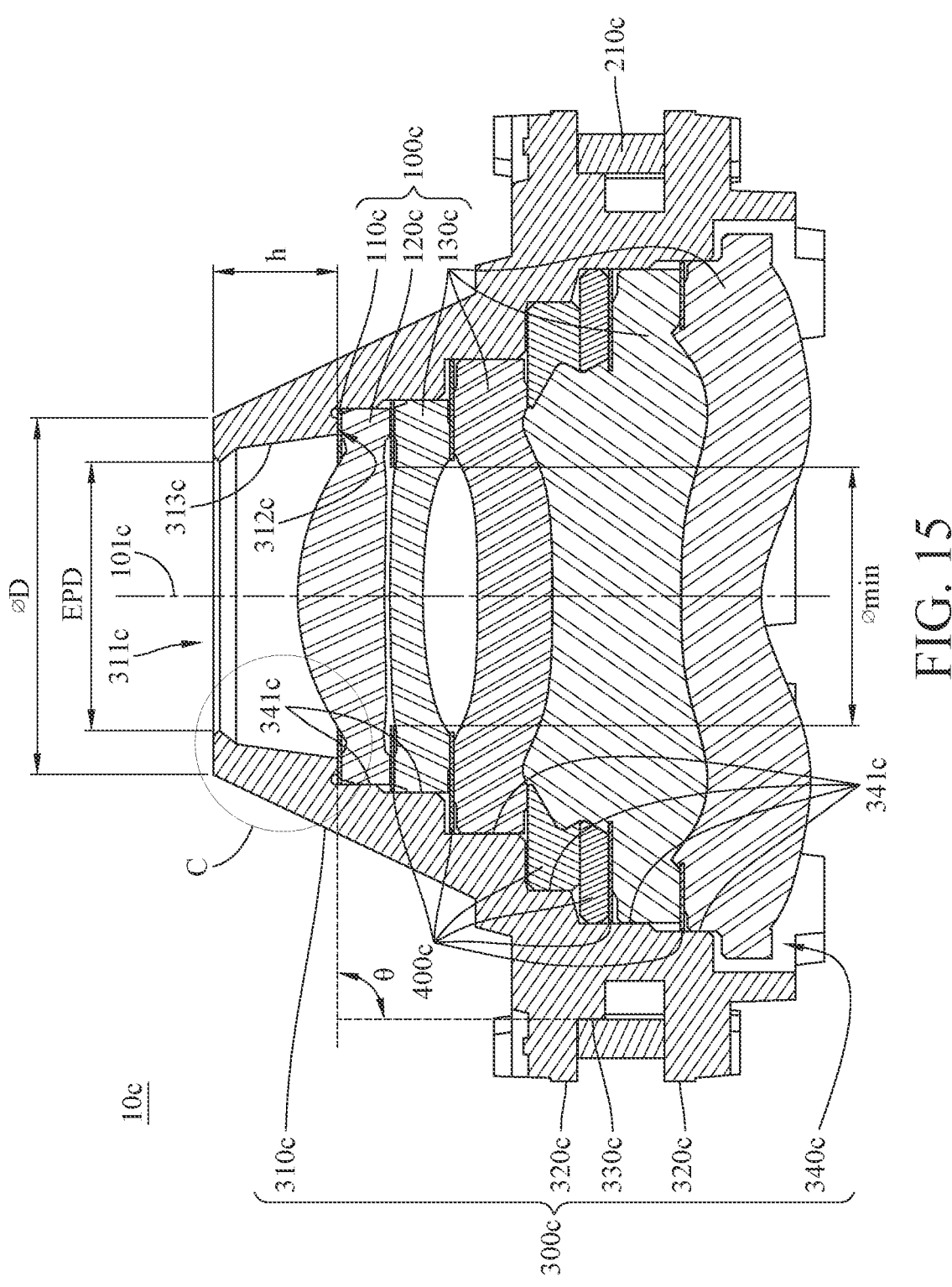
FIG. 15 is a cross-sectional view of the imaging lens assembly and lens carrier in FIG. 14.
Figure 16:
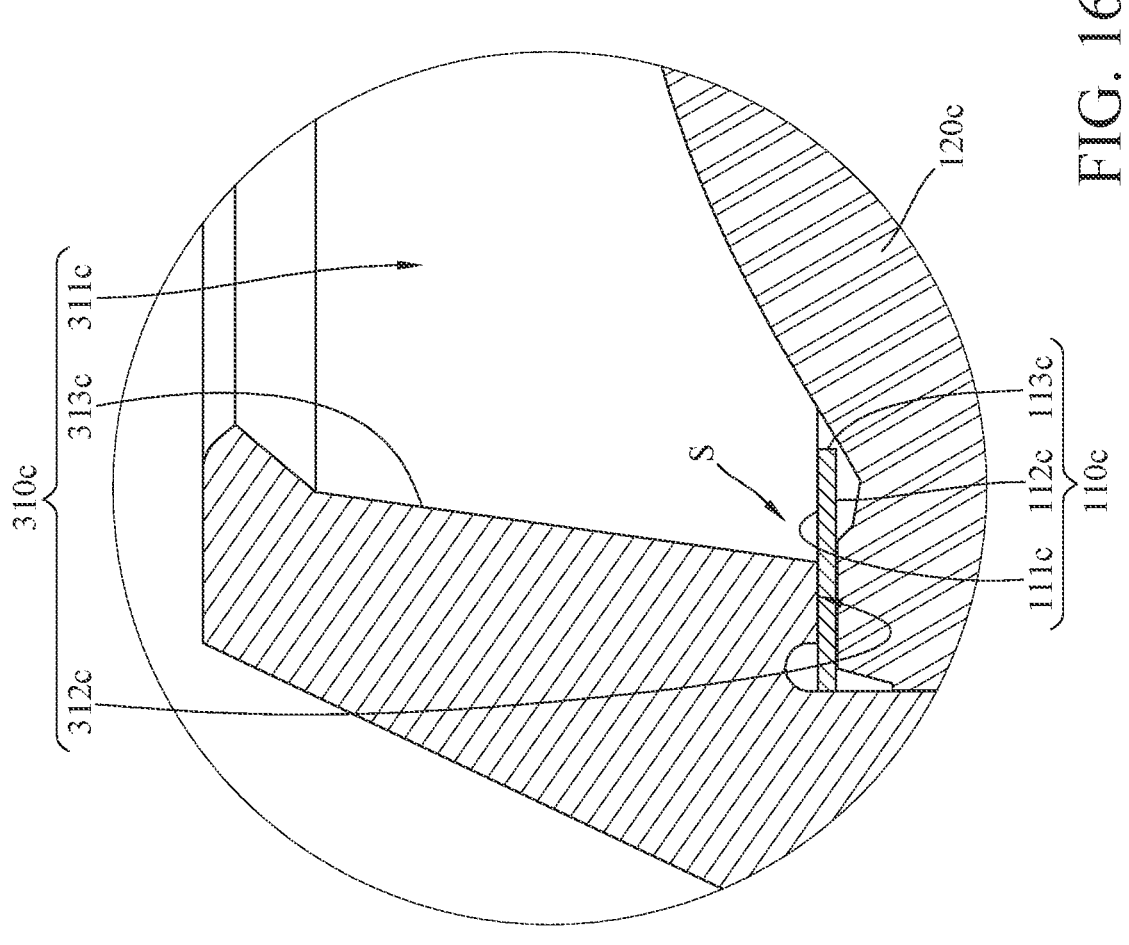
FIG. 16 is a partially enlarged view of the C region of the imaging lens assembly and lens carrier in FIG. 15.

FIG. 12 is a perspective view of an imaging lens module according to the 3rd embodiment of the present disclosure. FIG. 13 is an exploded view of the imaging lens module in FIG. 12. FIG. 14 is a partially sectioned view of the imaging lens assembly and lens carrier in FIG. 12. FIG. 15 is a cross-sectional view of the imaging lens assembly and lens carrier in FIG. 14. FIG. 16 is a partially enlarged view of the C region of the imaging lens assembly and lens carrier in FIG. 15.

In this embodiment, an imaging lens module 10$c$ with auto focus function includes a casing 11$c$, a support base 12$c$, an image sensor 13$c$, an imaging lens assembly 100$c$, an electromagnetic driving component assembly 200$c$, a lens carrier 300$c$ and a plurality of optical shielding components 400$c$. The casing 11$c$ and the image sensor 13$c$ are respectively disposed on two opposite sides of the support base 12$c$, and the imaging lens assembly 100$c$, the electromagnetic driving component assembly 200$c$, the lens carrier 300$c$ and the optical shielding components 400$c$ are disposed between the casing 11$c$ and the support base 12$c$.

The imaging lens assembly 100$c$ has an optical axis 101$c$ extending in a direction from an object side to an image side. The imaging lens assembly 100$c$ includes, in order from the object side to the image side, an optical shielding plate 110$c$, an object-side lens element 120$c$ and a plurality of optical lens elements 130$c$. The optical shielding plate 110$c$ has an object-side surface 111$c$, an image-side surface 112$c$ and a bore surface 113$c$, wherein the object-side surface 111$c$ faces toward the object side, the image-side surface 112$c$ faces toward the image side, and the bore surface 113$c$ is connected to the object-side surface 111$c$ and the image-side surface 112$c$. The optical shielding plate 110$c$ is disposed on an object side of the object-side lens element 120$c$, and the image-side surface 112$c$ of the optical shielding plate 110$c$ is in physical contact with the object-side lens element 120$c$. There is no additional optical lens element disposed on the object side of the object-side lens element 120$c$. The object-side lens element 120$c$ is made of plastic material.

The electromagnetic driving component assembly 200$c$ can drive the imaging lens assembly 100$c$ to move in a direction parallel to the optical axis 101$c$. Specifically, the electromagnetic driving component assembly 200$c$ includes a first driving component 210$c$ and a second driving component 220$c$. The first driving component 210$c$ is electrically conductive for an electric current to flow through. The second driving component 220$c$ is disposed on the casing 11$c$ and provides a permanent magnetic field toward the first driving component 210$c$. The electromagnetic driving component assembly 200$c$ can drive the imaging lens assembly 100$c$ to move with respect to the second driving component 220$c$ in the direction parallel to the optical axis 101$c$ by a Lorentz force generated by an electromagnetic interaction between the first driving component 210$c$ and the second driving component 220$c$ so as to achieve the auto-focus function of the imaging lens module 10$c$.

The lens carrier 300$c$ is disposed on the support base 12$c$ and the lens carrier 300$c$ can be one-piece formed by injection molding. The lens carrier 300$c$, as a carrier of the imaging lens assembly 100$c$, is for the imaging lens assembly 100$c$ to be mounted thereto such that the imaging lens assembly 100$c$ can be wholly driven to move with respect to the second driving component 220$c$ in the direction parallel to the optical axis 101$c$ by the Lorentz force generated by the electromagnetic driving component assembly 200$c$. The lens carrier 300c includes an object-side part 310c, a mounting structure 320c, a plurality of plate portions 330c and a tubular portion 340c.

The object-side part 310c is located at an object-side end of the lens carrier 300c. When a most-object-side outer diameter of the object-side part 310c is ϕD, the following condition is satisfied: ϕD=2.18 [mm]. The object-side part 310c includes a tip-end minimal aperture 311c, a first annular mounting surface 312c and a tapered surface 313c.

The tip-end minimal aperture 311c can control the amount of light travelling in the imaging lens assembly 100c so as to be an aperture stop of the imaging lens assembly 100c. When an entrance pupil diameter of the imaging lens assembly 100c defined by the tip-end minimal aperture 311c is EPD, and the most-object-side outer diameter of the object-side part 310c is ϕD, the following condition is satisfied: EPD/ϕD=0.75.

The first annular mounting surface 312c faces toward the image side. The first annular mounting surface 312c is for the optical shielding plate 110c to be mounted thereon and in physical contact with the object-side surface 111c of the optical shielding plate 110c. When an axial distance on the optical axis 101c between the tip-end minimal aperture 311c and the first annular mounting surface 312c is h, the following condition is satisfied: h=0.72 [mm]. In this embodiment, since the tip-end minimal aperture 311c is taken as a protruded aperture stop, and the optical shielding plate 110c is disposed on the object-side end of the lens carrier 300c, so that the imaging lens module 10c can be equipped with a miniaturized voice coil motor.

The tapered surface 313c surrounds the tip-end minimal aperture 311c. An area surrounded by the tapered surface 313c tapers off from the image side to the object side, and the tapered surface 313c extends to the first annular mounting surface 312c. The tapered surface 313c is a surface of a truncated cone. The tapered surface 313c and the object-side surface 111c of the optical shielding plate 110c are configured to form an annular groove structure. An air interlayer S between the tapered surface 313c and the object-side surface 111c of the optical shielding plate 110c tapers off away from the tip-end minimal aperture 311c.

The mounting structure 320c can be configured for the first driving component 210c to be mounted thereto. By the Lorentz force which is generated by the electromagnetic interaction between the first driving component 210c and the second driving component 220c, the lens carrier 300c, which is for the first driving component 210c to be mounted thereto, can be driven by the Lorentz force, and the imaging lens assembly 100c, which is for the lens carrier 300c to be mounted thereto, can also be wholly driven by the Lorentz force. Therefore, the imaging lens assembly 100c and the lens carrier 300c can be driven to move with respect to the second driving component 220c in the direction parallel to the optical axis 101c.

The plate portions 330c are located at the mounting structure 320c and have two opposite sides overlapping with the mounting structure 320c in the direction parallel to the optical axis 101c. That is, the plate portions 330c is clamped by the mounting structure 320c. The plate portions 330c, together with the mounting structure 320c, can be configured for the first driving component 210c to be mounted thereto, but the present disclosure is not limited thereto. In some embodiments, the plate portions, together with the mounting structure, can be configured for the second driving component to be mounted thereto, and the first driving component is disposed on the casing. The imaging lens assembly and the lens carrier can be wholly driven to move with respect to the first driving component in the direction parallel to the optical axis by the Lorentz force generated by the electromagnetic interaction between the first driving component and the second driving component. In this embodiment, when an angle between each of the plate portions 330c and the first annular mounting surface 312c is θ, the following condition is satisfied: θ=90.0 [deg.]. In addition, in some other embodiments, the plate portions can also be provided with a magnet such that the imaging lens assembly can be moved by using a spherical bearing in the imaging lens module.

The tubular portion 340c is connected to the object-side part 310c. The tubular portion 340c includes a plurality of second annular mounting surfaces 341c. The second annular mounting surfaces 341c face toward and surround the optical axis 101c. The second annular mounting surfaces 341c are arranged coaxially from the object side to the image side, and the second annular mounting surfaces 341c have diameters increasing from the object side to the image side. Some of the second annular mounting surfaces 341c are in physical contact with the optical lens elements 130c, and another some of the second annular mounting surfaces 341c are in physical contact with the optical shielding components 400c.

The optical shielding components 400c are located at an image side of the optical shielding plate 110c and the most-object side lens element 120c. When the entrance pupil diameter of the imaging lens assembly 100c is EPD, and a minimum value among aperture diameters of the optical shielding components 400c is ϕmin, the following condition is satisfied: EPD/ϕmin=1.19.

4th Embodiment

Figure 17:
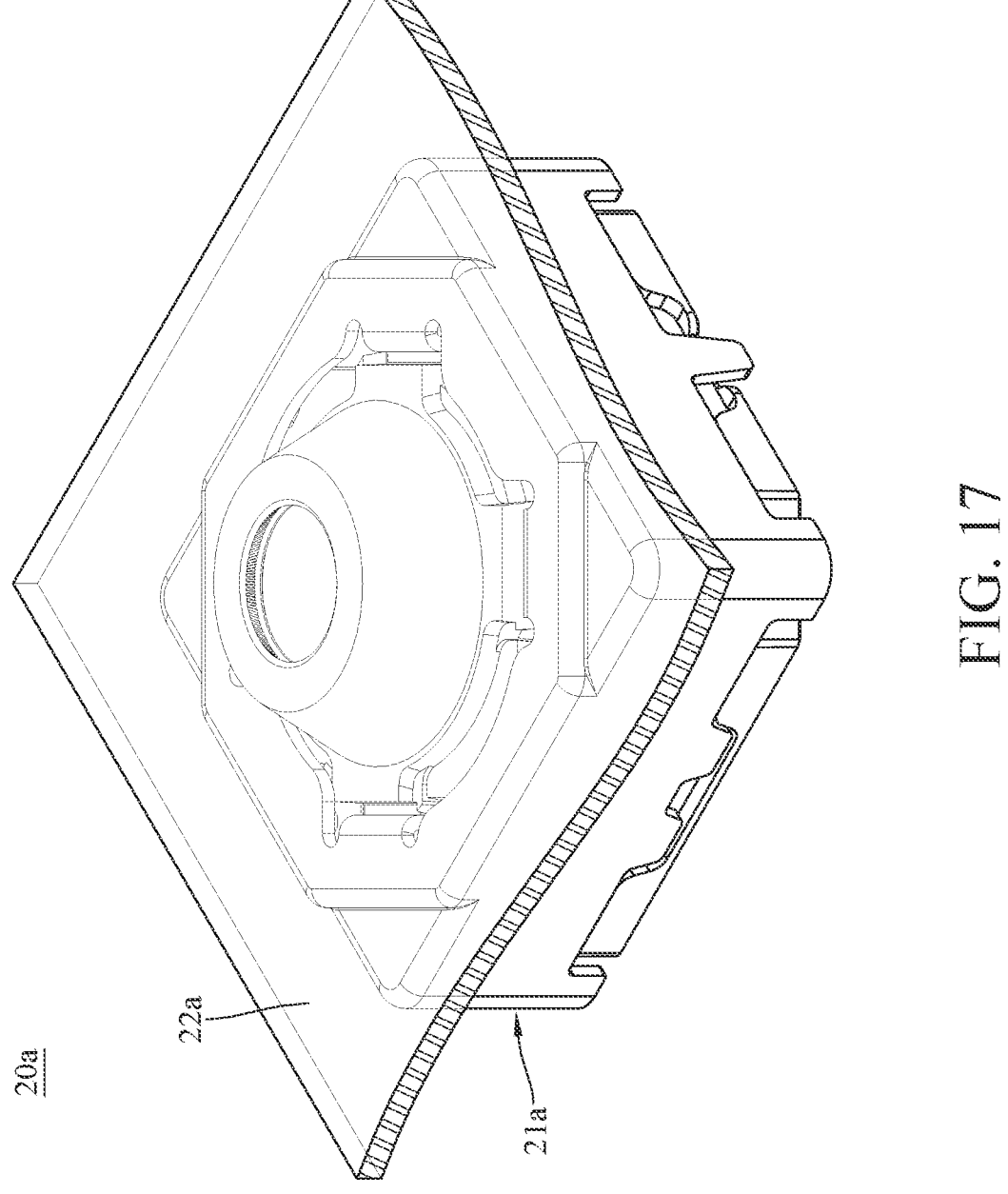
FIG. 17 is a partially perspective view of an electronic device according to the 4th embodiment of the present disclosure.
Figure 18:
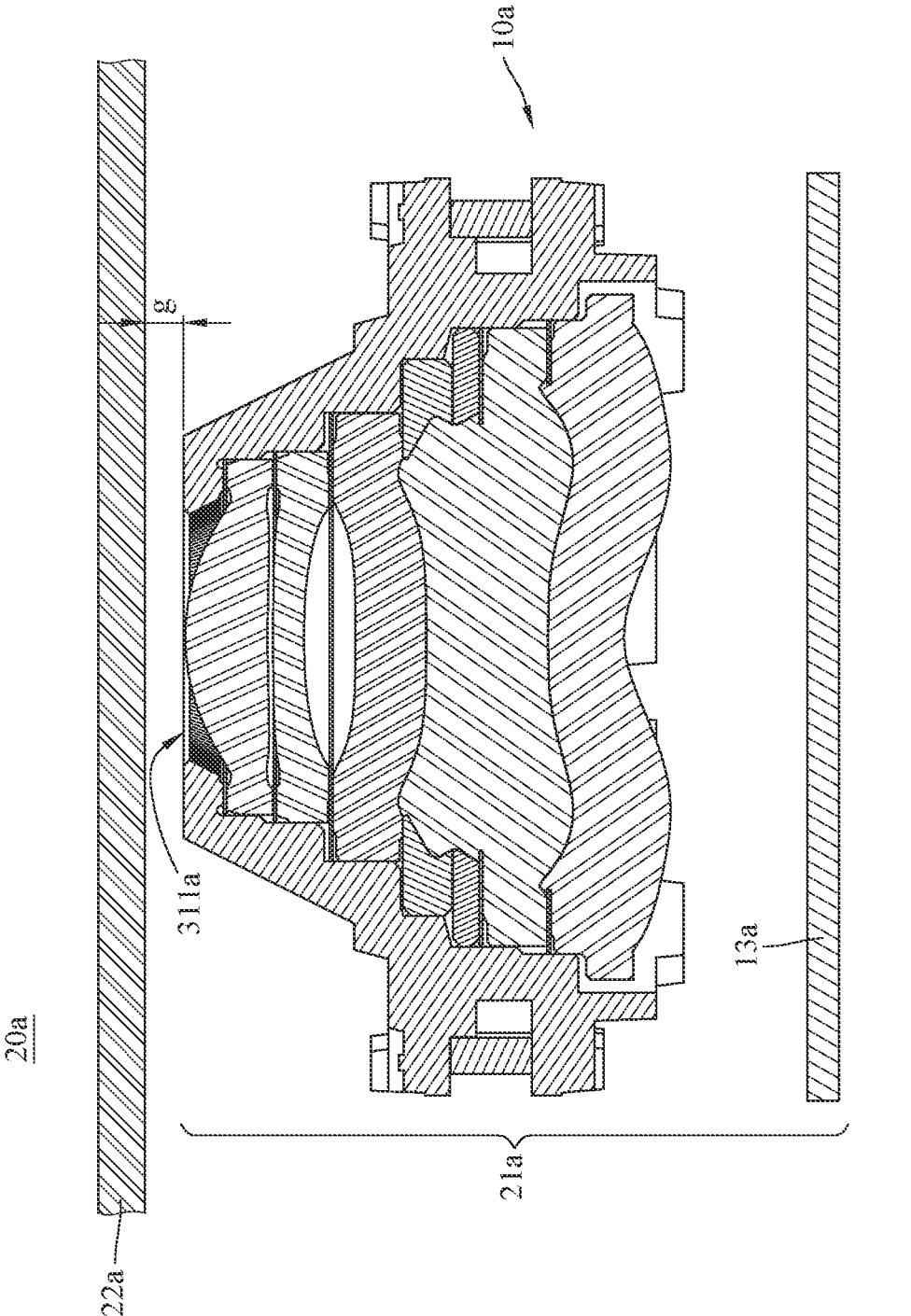
FIG. 18 is a partially cross-sectional view of the electronic device in FIG. 17.
Figure 19:
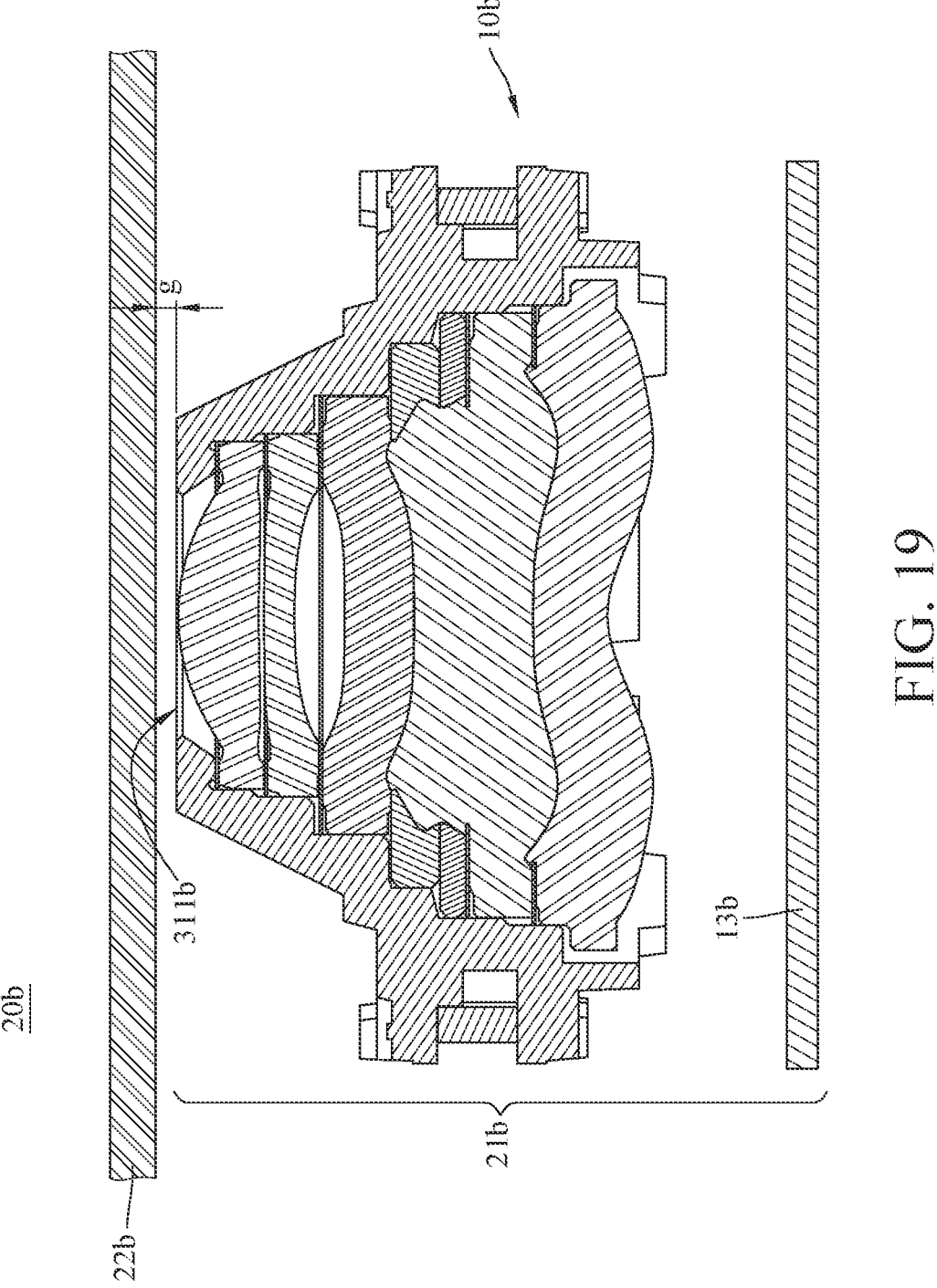
FIG. 19 is a partially cross-sectional view of an electronic device according to the 5th embodiment of the present disclosure.

FIG. 17 is a partially perspective view of an electronic device according to the 4th embodiment of the present disclosure. FIG. 18 is a partially cross-sectional view of the electronic device in FIG. 17. FIG. 19 is a partially cross-sectional view of an electronic device according to the 5th embodiment of the present disclosure. In this embodiment, an electronic device 20a with photographing function includes a camera module 21a and a cover glass 22a.

The camera module 21a includes an imaging lens module 10a. The imaging lens module 10a includes an image sensor 13a. The cover glass 22a is disposed on an object side of the camera module 21a. The cover glass 22a is a panel including, for example, a backlight module as a display module (not shown). When an axial distance on the optical axis 101a between the tip-end minimal aperture 311a of the imaging lens module 100a and the cover glass 22a is g, the following condition is satisfied: g=0.29 [mm].

5th Embodiment

FIG. 19 is a partially cross-sectional view of an electronic device according to the 5th embodiment of the present disclosure. In this embodiment, an electronic device 20b with photographing function includes a camera module 21b and a cover glass 22b.

The camera module 21b includes an imaging lens module 10b. The imaging lens module 10b includes an image sensor 13b. The cover glass 22b is disposed on an object side of the camera module 21b. The cover glass 22b is a panel including, for example, a backlight module as a display module (not shown). When an axial distance on the optical axis 101b between the tip-end minimal aperture 311b of the imaging lens module 100*b* and the cover glass 22*b* is g, the following condition is satisfied: g=0.18 [mm].

6th Embodiment

Figure 20:
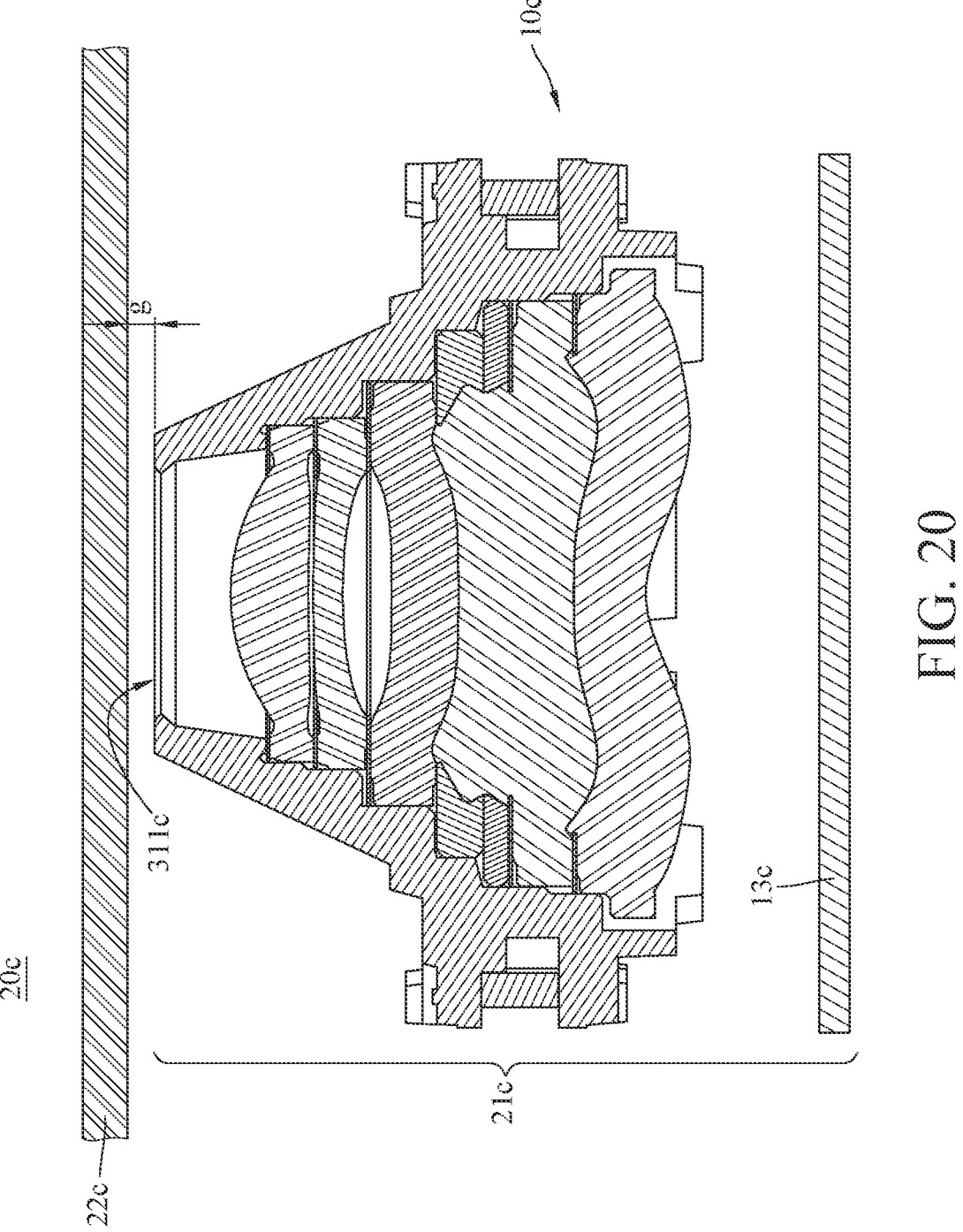
FIG. 20 is a partially cross-sectional view of an electronic device according to the 6th embodiment of the present disclosure.

FIG. 20 is a partially cross-sectional view of an electronic device according to the 6th embodiment of the present disclosure. In this embodiment, an electronic device 20*c* with photographing function includes a camera module 21*c* and a cover glass 22*c*.

The camera module 21*c* includes an imaging lens module 10*c*. The imaging lens module 10*c* includes an image sensor 13*c*. The cover glass 22*c* is disposed on an object side of the camera module 21*c*. The cover glass 22*c* is a panel including, for example, a backlight module as a display module (not shown). When an axial distance on the optical axis 101*c* between the tip-end minimal aperture 311*c* of the imaging lens module 100*c* and the cover glass 22*c* is g, the following condition is satisfied: g=0.23 [mm].

7th Embodiment

Figure 21:
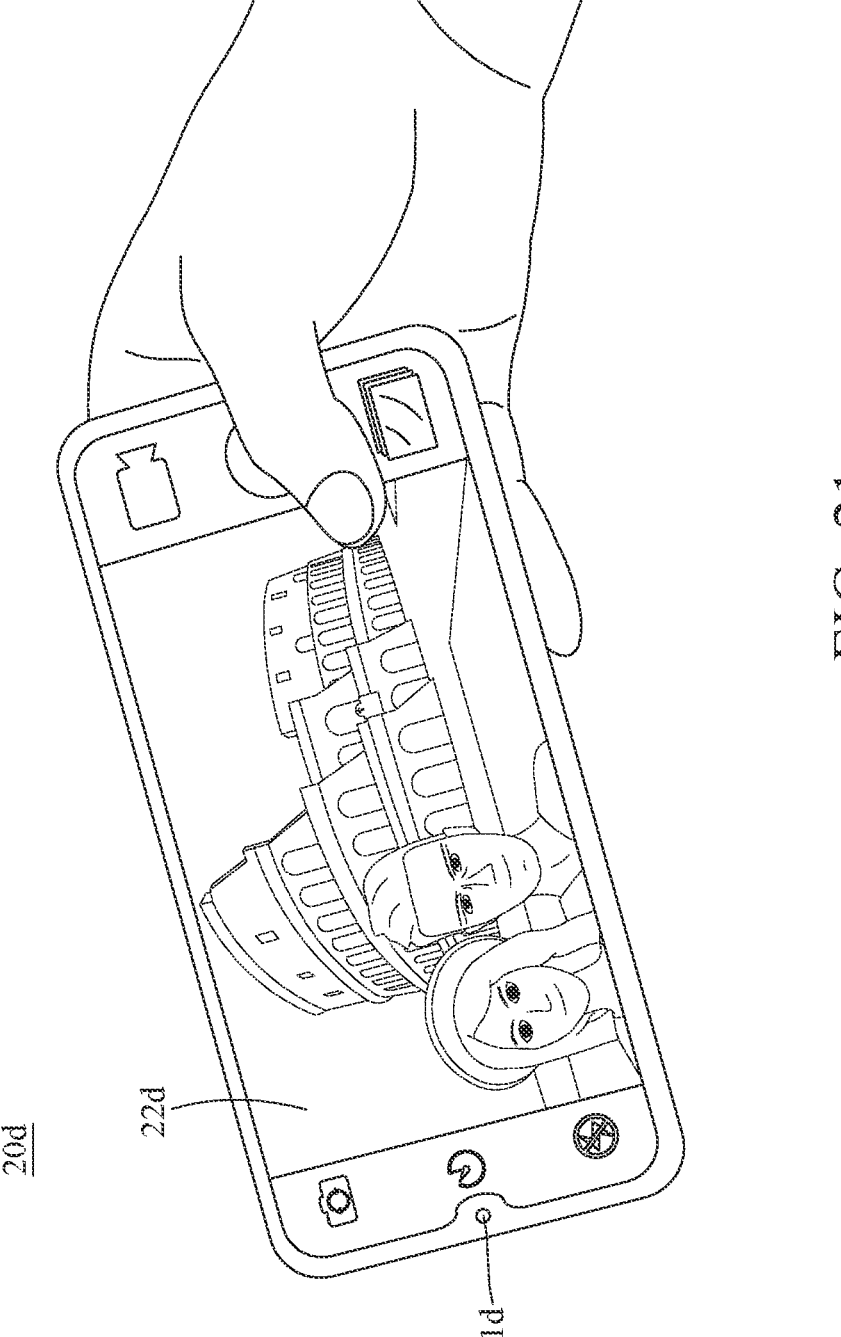
FIG. 21 is a perspective view of an electronic device according to the 7th embodiment of the present disclosure.

FIG. 21 is a perspective view of an electronic device according to the 7th embodiment of the present disclosure. In this embodiment, an electronic device 20*d* with photographing function includes a camera module 21*d* and a cover glass 22*d*.

The camera module 21*d* is a microlens, and can be one of the aforementioned camera modules 21*a*, 21*b* and 21*c*, but the present disclosure is not limited thereto. The cover glass 22*d* can be one of the aforementioned cover glasses 22*a*, 22*b* and 22*c*, but the present disclosure is not limited thereto. The cover glass 22*d* is a panel including, for example, a backlight module as a display module (not shown), and can be taken as a user interface (not numbered) of the electronic device 20*d*. The user interface can be a touch screen or a display screen for being operated by users, but the present disclosure is not limited thereto.

Figure 23:
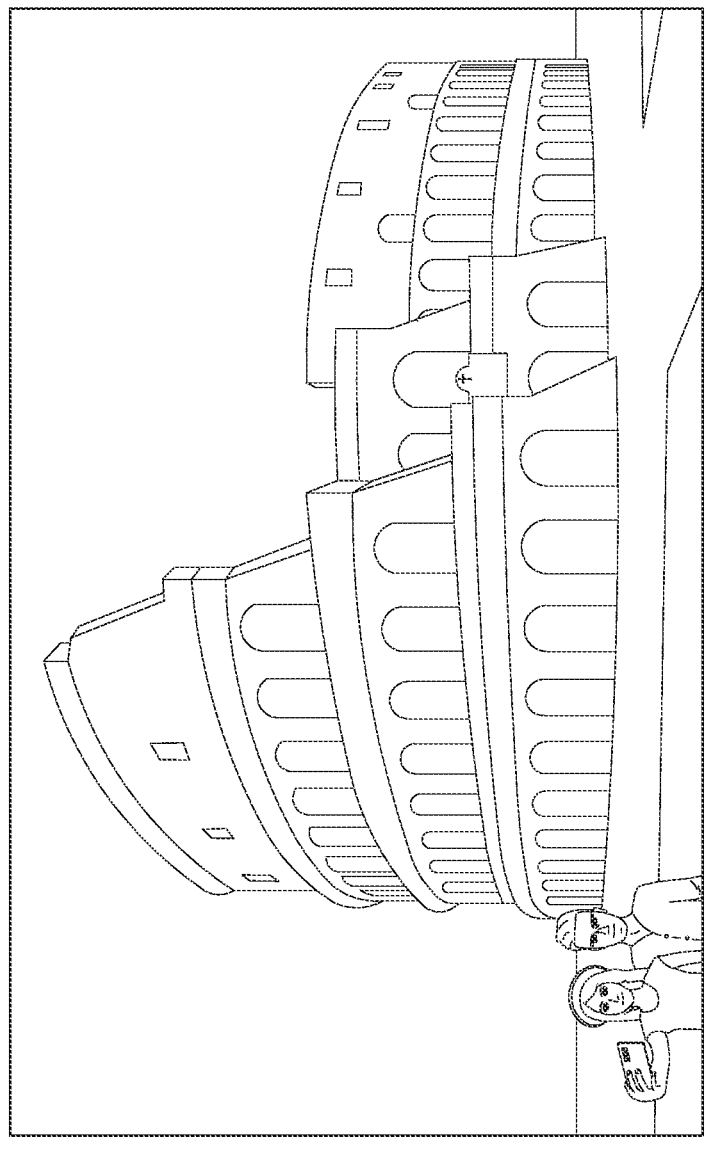
FIG. 23 is a schematic view of capturing an image by a camera module of an electronic device.
Figure 24:
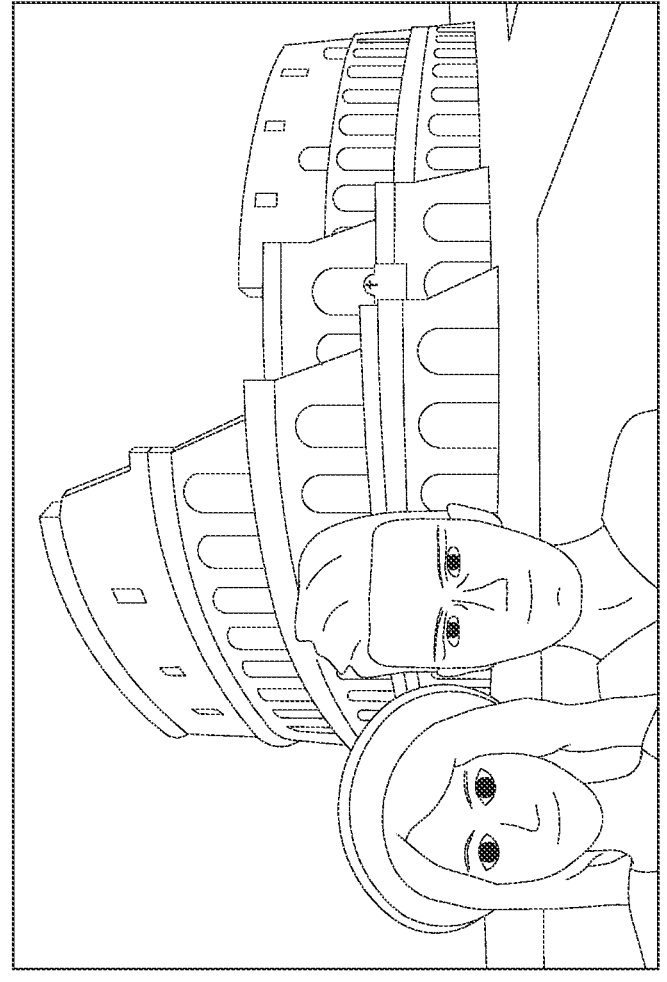
FIG. 24 is a schematic view of an image captured by a camera module of an electronic device.

In this embodiment, the camera module 21*d* and the cover glass 22*d* are disposed on the same side of the electronic device 20*d*, and the camera module 21*d* is disposed on an area beside the user interface. The camera module 21*d* and the cover glass 22*d* face toward the user, so that when the user is taking selfie or live-streaming by the electronic device 20*d*, the user can simultaneously view the captured images and perform interface operation, and thus the electronic device 20*d* can provide a good experience in photo shooting. Please refer to FIG. 23 and FIG. 24. FIG. 23 is a schematic view of capturing an image by the camera module 21*d* of the electronic device 20*d*. FIG. 24 is a schematic view of the image captured by the camera module 21*d* of the electronic device 20*d*.

8th Embodiment

Figure 22:
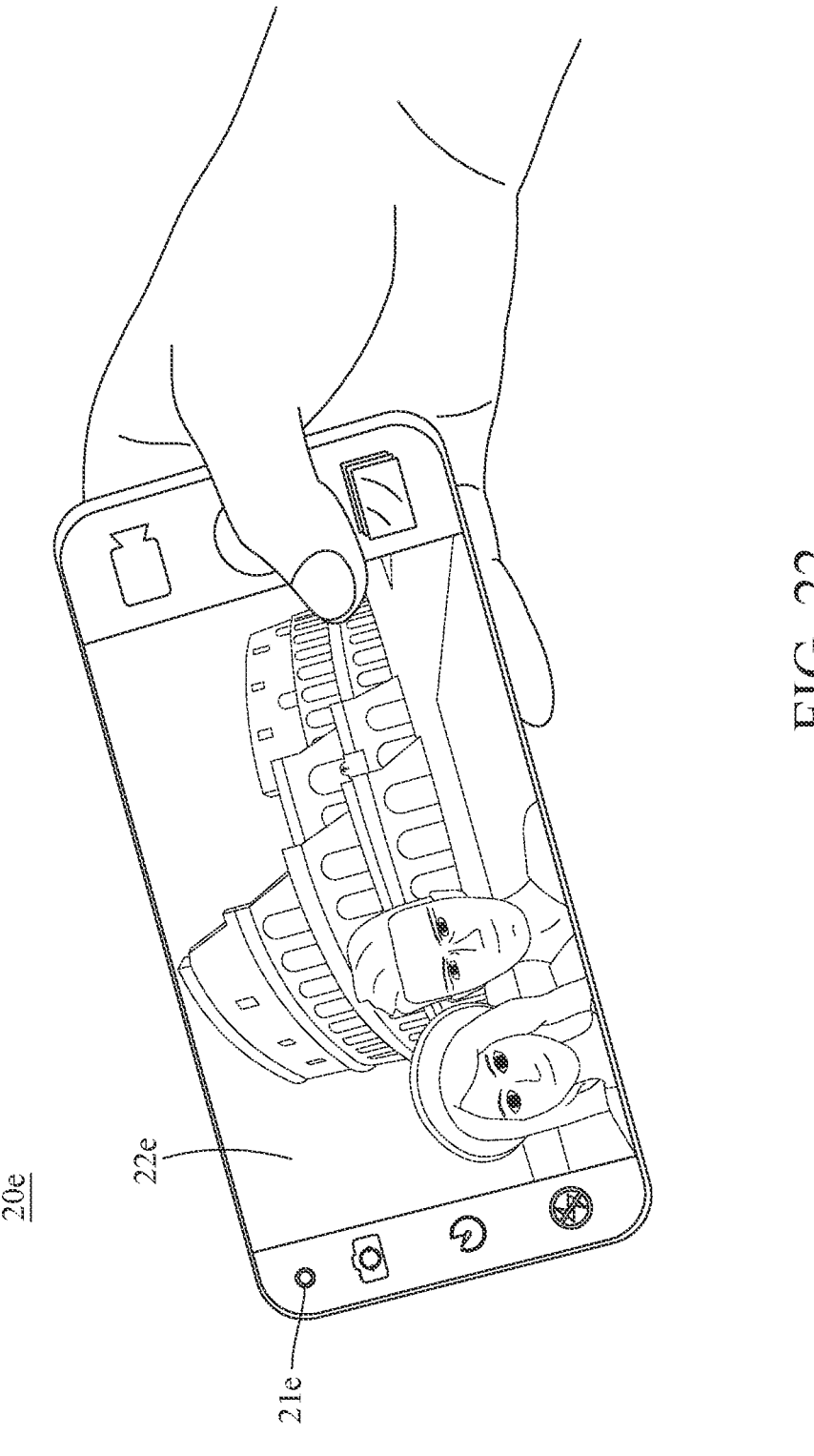
FIG. 22 is a perspective view of an electronic device according to the 8th embodiment of the present disclosure.

FIG. 22 is a perspective view of an electronic device according to the 8th embodiment of the present disclosure. In this embodiment, an electronic device 20*e* with photographing function includes a camera module 21*e* and a cover glass 22*e*.

The camera module 21*e* is an under-display lens, and can be one of the aforementioned camera modules 21*a*, 21*b* and 21*c*, but the present disclosure is not limited thereto. The cover glass 22*e* can be one of the aforementioned cover glasses 22*a*, 22*b* and 22*c*, but the present disclosure is not limited thereto. The cover glass 22*e* is a panel including, for example, a backlight module as a display module (not shown), and can be taken as a user interface (not numbered) of the electronic device 20*e*. The user interface can be a touch screen or a display screen for being operated by users, but the present disclosure is not limited thereto.

In this embodiment, the camera module 21*e* and the cover glass 22*e* are disposed on the same side of the electronic device 20*e*, and the camera module 21*e* is disposed on an area under the user interface. The camera module 21*e* and the cover glass 22*e* face toward the user, so that when the user is taking selfie or live-streaming by the electronic device 20*e*, the user can simultaneously view the captured images and perform interface operation, and thus the electronic device 20*e* can provide a good experience in photo shooting. Please refer to FIG. 23 and FIG. 24. FIG. 23 is a schematic view of capturing an image by the camera module 21*e* of the electronic device 20*e*. FIG. 24 is a schematic view of the image captured by the camera module 21*e* of the electronic device 20*e*.

The smartphone in this embodiment is only exemplary for showing the imaging lens module of the present disclosure installed in an electronic device, and the present disclosure is not limited thereto. The imaging lens module can be optionally applied to optical systems with a movable focus. Furthermore, the imaging lens module features good capability in aberration corrections and high image quality, and can be applied to 3D (three-dimensional) image capturing applications, in products such as digital cameras, mobile devices, digital tablets, smart televisions, network surveillance devices, dashboard cameras, vehicle backup cameras, multi-camera devices, image recognition systems, motion sensing input devices, wearable devices and other electronic imaging devices.

The foregoing description, for the purpose of explanation, has been described with reference to specific embodiments. It is to be noted that the present disclosure shows different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An imaging lens module with auto focus function, comprising:
   an imaging lens assembly, having an optical axis, and the imaging lens assembly comprising:
      an optical shielding plate, having an object-side surface, an image-side surface and a bore surface, and the bore surface being connected to the object-side surface and the image-side surface; and
      at least three lens elements, wherein one of the at least three lens elements is a most-object-side lens element, and the optical shielding plate is disposed on an object side of the most-object-side lens element;
   an electromagnetic driving component assembly, configured to drive the imaging lens assembly to move in a direction parallel to the optical axis, and the electromagnetic driving component assembly comprising:
      a first driving component, being electrically conductive and configured for an electric current to flow through; and a second driving component, providing a permanent magnetic field toward the first driving component;

wherein the electromagnetic driving component assembly drives the imaging lens assembly to move in the direction parallel to the optical axis by a Lorentz force generated by an electromagnetic interaction between the first driving component and the second driving component; and a lens carrier, for the imaging lens assembly to be mounted thereto such that the imaging lens assembly can be wholly driven to move in the direction parallel to the optical axis by the Lorentz force, and the lens carrier comprising:

an object-side part, located at an object-side end of the lens carrier, and the object-side part comprising:

a tip-end minimal aperture, configured for light to travel through in the imaging lens assembly; and a first annular mounting surface, facing toward an image side, the first annular mounting surface being for the optical shielding plate to be mounted thereon, and the first annular mounting surface being in physical contact with the object-side surface of the optical shielding plate; and a mounting structure, configured for one of the first driving component and the second driving component to be mounted thereto;

wherein the object-side part of the lens carrier further comprises a tapered surface, the tapered surface surrounds the tip-end minimal aperture, an area surrounded by the tapered surface tapers off from the image side to an object side, and the tapered surface extends to the first annular mounting surface; and wherein an entrance pupil diameter of the imaging lens assembly is defined by the tip-end minimal aperture of the lens carrier, the entrance pupil diameter of the imaging lens assembly is EPD, a most-object-side outer diameter of the object-side part is $\Phi D$, an axial distance on the optical axis between the tip-end minimal aperture and the first annular mounting surface is h, and the following conditions are satisfied:

$$0.55 < EPD/\Phi D < 1.0; \text{ and}$$

$$0.15 \text{ [mm]} \leq h \leq 1.3 \text{ [mm]}.$$

2. The imaging lens module of claim 1, wherein the lens carrier further comprises a tubular portion, the tubular portion is connected to the object-side part, the tubular portion comprises a plurality of second annular mounting surfaces, the plurality of second annular mounting surfaces face toward and surround the optical axis, the plurality of second annular mounting surfaces are arranged coaxially from the object side to the image side, and the plurality of second annular mounting surfaces have diameters increasing from the object side to the image side.

3. The imaging lens module of claim 2, wherein the imaging lens assembly further comprises at least one optical lens element, and at least one of the plurality of the second annular mounting surfaces is in physical contact with the at least one optical lens element.

4. The imaging lens module of claim 1, wherein the object-side part of the lens carrier further comprises a plurality of straight structures, the plurality of straight structures are disposed on the tapered surface and surround the tip-end minimal aperture, and the plurality of straight structures extend away from the tip-end minimal aperture.

5. The imaging lens module of claim 4, wherein the plurality of straight structures each have a cross-section being wedge-shaped, a number of the plurality of straight structures is N, and the following condition is satisfied:

$$65 < N < 700.$$

6. The imaging lens module of claim 1, wherein the tapered surface is a surface of a truncated cone, the tapered surface and the object-side surface of the optical shielding plate are configured to form an annular groove structure, and an air interlayer between the tapered surface and the object-side surface of the optical shielding plate tapers off away from the tip-end minimal aperture.

7. The imaging lens module of claim 1, further comprising a plurality of optical shielding components, wherein the plurality of optical shielding components are located on an image side of the optical shielding plate, an entrance pupil diameter of the imaging lens assembly is defined by the tip-end minimal aperture of the lens carrier, the entrance pupil diameter of the imaging lens assembly is EPD, a minimum value among aperture diameters of the plurality of optical shielding components is $\Phi$min, and the following condition is satisfied:

$$0.90 < EPD/\Phi min < 1.4.$$

8. The imaging lens module of claim 7, wherein the entrance pupil diameter of the imaging lens assembly is EPD, the minimum value among aperture diameters of the plurality of optical shielding components is $\Phi$min, and the following condition is satisfied:

$$0.94 < EPD/\Phi min < 1.36.$$

9. The imaging lens module of claim 8, wherein the entrance pupil diameter of the imaging lens assembly is EPD, the minimum value among aperture diameters of the plurality of optical shielding components is $\Phi$min, and the following condition is satisfied:

$$0.98 < EPD/\Phi min < 1.30.$$

10. The imaging lens module of claim 1, wherein the axial distance on the optical axis between the tip-end minimal aperture and the first annular mounting surface is h, and the following condition is satisfied:

$$0.15 \text{ [mm]} \leq h \leq 1.0 \text{ [mm]}.$$

11. An electronic device with photographing function, comprising:

a camera module, comprising the imaging lens module of claim 1; and a cover glass, disposed on an object side of the camera module;

wherein an axial distance on the optical axis between the tip-end minimal aperture of the imaging lens module and the cover glass is g, and the following condition is satisfied:

$$0.03 \text{ [mm]} < g < 0.3 \text{ [mm]}.$$

12. The electronic device of claim 11, wherein the cover glass is a panel comprising a display module.

* * * * *